(12) United States Patent
Wedig et al.

(10) Patent No.: US 11,276,219 B2
(45) Date of Patent: Mar. 15, 2022

(54) SYSTEMS AND METHODS FOR CROSS-APPLICATION AUTHORING, TRANSFER, AND EVALUATION OF RIGGING CONTROL SYSTEMS FOR VIRTUAL CHARACTERS

(71) Applicant: Magic Leap, Inc., Plantation, FL (US)

(72) Inventors: Geoffrey Wedig, Torrance, CA (US); James Jonathan Bancroft, Culver City, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/047,339

(22) PCT Filed: Apr. 12, 2019

(86) PCT No.: PCT/US2019/027350
§ 371 (c)(1),
(2) Date: Oct. 13, 2020

(87) PCT Pub. No.: WO2019/204164
PCT Pub. Date: Oct. 24, 2019

(65) Prior Publication Data
US 2021/0118212 A1    Apr. 22, 2021

Related U.S. Application Data

(60) Provisional application No. 62/658,415, filed on Apr. 16, 2018.

(51) Int. Cl.
*G06T 13/40* (2011.01)
*G06T 19/00* (2011.01)

(52) U.S. Cl.
CPC ............ *G06T 13/40* (2013.01); *G06T 19/006* (2013.01); *G06T 2213/08* (2013.01); *G06T 2213/12* (2013.01)

(58) Field of Classification Search
CPC ... G06T 13/40; G06T 19/006; G06T 2213/12; G06T 2213/08; G06T 13/00; G06T 19/00;
(Continued)

(56) References Cited

U.S. PATENT DOCUMENTS 6,850,221 B1   2/2005   Tickle
7,966,274 B2   6/2011   Adams
(Continued)

FOREIGN PATENT DOCUMENTS

WO    WO 2019/204164    10/2019

OTHER PUBLICATIONS

International Search Report and Written Opinion for PCT Application No. PCT/US2019/027350, dated Aug. 19, 2019.
(Continued)

*Primary Examiner* — Xilin Guo
(74) *Attorney, Agent, or Firm* — Knobbe, Martens, Olson & Bear, LLP

(57) ABSTRACT

Various examples of cross-application systems and methods for authoring, transferring, and evaluating rigging control systems for virtual characters are disclosed. A first application, which implements a first rigging control protocol, can provide an input associated with a request for a behavior from the rig for the virtual character. The input can be converted to be compatible with a second rigging control protocol that is different from the first rigging control protocol. One or more control systems can be evaluated based on the input to determine an output to provide the requested behavior from the virtual character rig. The one or more control systems can be defined according to the second rigging control protocol. The output can be converted to be compatible with the first rigging control protocol and provided to the first application to manipulate the virtual character according to the requested behavior.

49 Claims, 18 Drawing Sheets

(58) Field of Classification Search
CPC .......... G06T 19/20; G06T 2207/30196; G06T 13/20; G06T 7/73; G06T 15/04; G06T 17/00; G06N 3/0454; G06N 3/0445; G06K 9/00342; G06K 9/00302
See application file for complete search history.

(56) References Cited

U.S. PATENT DOCUMENTS

| | | | |
|---|---|---|---|
| 9,081,426 | B2 | 7/2015 | Armstrong |
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,535,174 | B1* | 1/2020 | Rigiroli ............... G06T 13/40 |
| 2004/0174361 | A1* | 9/2004 | Yomdin ............... G06T 9/20 345/441 |
| 2005/0219250 | A1* | 10/2005 | Sepulveda ............ G06T 13/40 345/473 |
| 2006/0028436 | A1 | 2/2006 | Armstrong |
| 2007/0081123 | A1 | 4/2007 | Lewis |
| 2009/0091563 | A1* | 4/2009 | Viz ................... G06T 13/40 345/419 |
| 2011/0098113 | A1* | 4/2011 | Lanciault ............ G06T 13/20 463/32 |
| 2011/0216074 | A1 | 9/2011 | Witkin et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0198106 | A1 | 7/2014 | Sumner et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0022516 | A1 | 1/2015 | Judan et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2017/0091977 | A1 | 3/2017 | West |
| 2018/0144531 | A1* | 5/2018 | Aguado ............... G06T 19/003 |
| 2018/0197322 | A1* | 7/2018 | Sagar ................ G06T 13/00 |
| 2018/0296916 | A1* | 10/2018 | Chung ............... H04L 67/38 |

OTHER PUBLICATIONS

FBX Content Pipeline, in 2 pages, 2004-2017, Epic Games, URL: https://docs.unrealengine.com/latest/INT/Engine/Content/FBX/index.html, downloaded on Jan. 12, 2018.

International Preliminary Report on Patentability for PCT Application No. PCT/US2019/027350, dated Oct. 20, 2020.

ARToolKit: https://web.archive.Org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

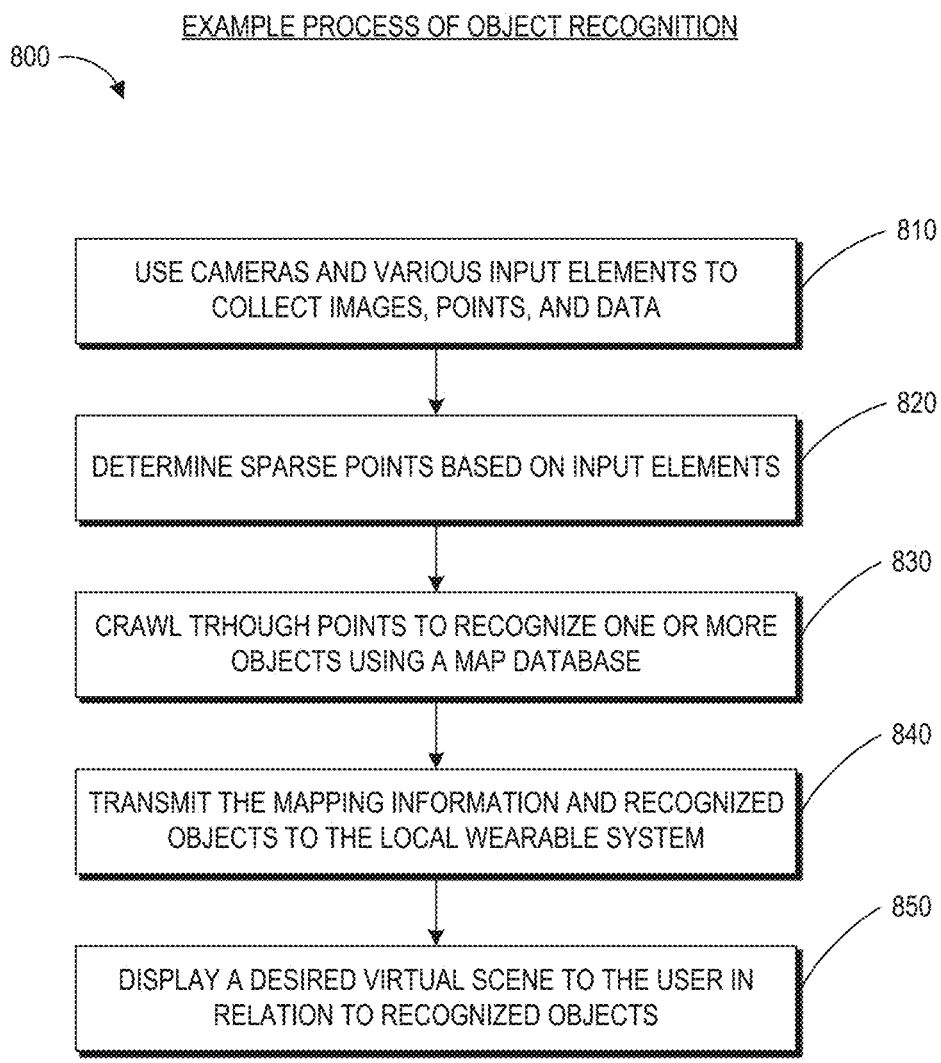

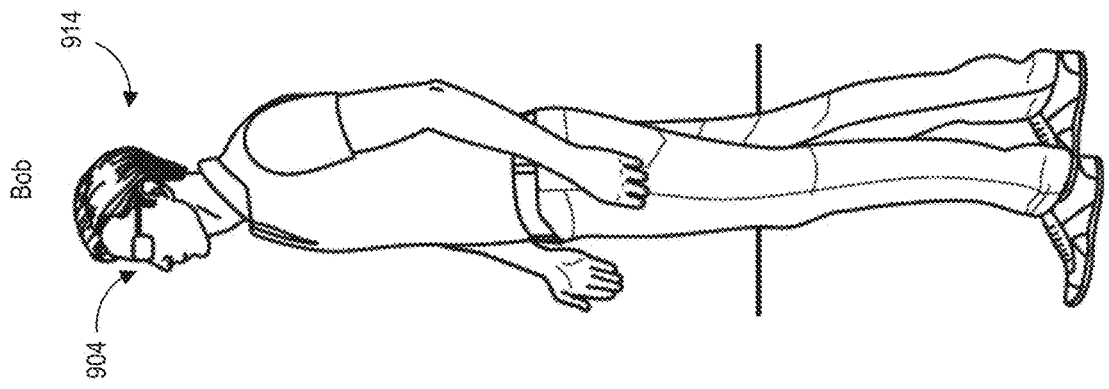
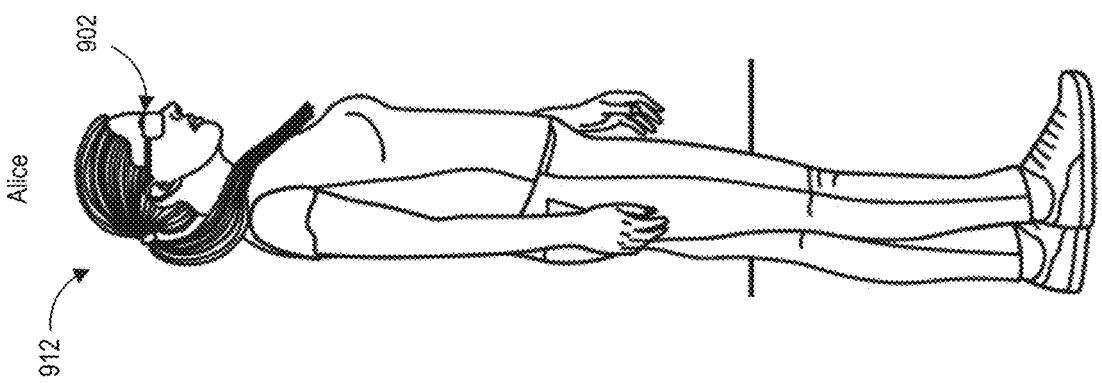
FIG.9B

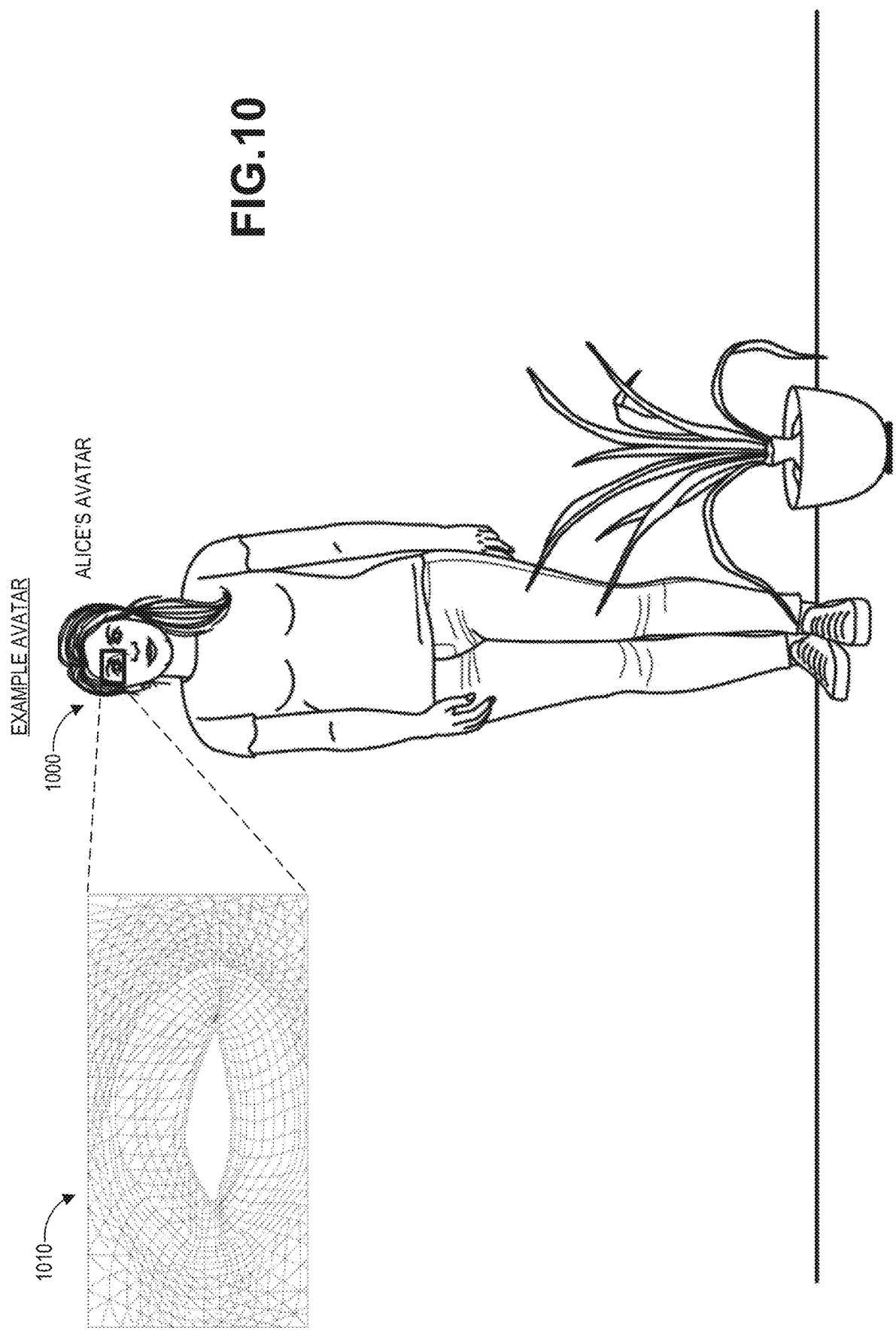

SYSTEMS AND METHODS FOR CROSS-APPLICATION AUTHORING, TRANSFER, AND EVALUATION OF RIGGING CONTROL SYSTEMS FOR VIRTUAL CHARACTERS

INCORPORATION BY REFERENCE TO ANY PRIORITY APPLICATIONS

This application is a national phase of PCT Patent Application PCT/US2019/027350, filed Apr. 12, 2019, and entitled "SYSTEMS AND METHODS FOR CROSS-APPLICATION AUTHORING, TRANSFER, AND EVALUATION OF RIGGING CONTROL SYSTEMS FOR VIRTUAL CHARACTERS," which claims priority to U.S. Provisional Patent Application No. 62/658,415, filed Apr. 16, 2018, and entitled "SYSTEMS AND METHODS FOR CROSS-APPLICATION AUTHORING, TRANSFER, AND EVALUATION OF RIGGING CONTROL SYSTEMS FOR VIRTUAL CHARACTERS." Any and all applications for which a foreign or domestic priority claim is identified above and/or in the Application Data Sheet as filed with the present application are hereby incorporated by reference under 37 CFR 1.57.

FIELD

The present disclosure relates to virtual reality and augmented reality, including mixed reality, imaging and visualization systems, and more particularly to tools for efficiently enabling cross-application configurations of virtual characters.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

In some embodiments, a method for executing a rig for a virtual character comprises: receiving, from a first application which implements a first rigging control protocol, an input associated with a request for a behavior from the rig for the virtual character; converting the input to be compatible with a second rigging control protocol that is different from the first rigging control protocol; evaluating one or more control systems, based on the input, to determine an output to provide the requested behavior from the virtual character rig, the one or more control systems being defined according to the second rigging control protocol; converting the output to be compatible with the first rigging control protocol; and providing the output to the first application to manipulate the virtual character according to the requested behavior.

In some embodiments, a method for transferring a rigging control system for a virtual character comprises: creating, in a first application which implements a first rigging control protocol, a rigging control system description, the rigging control system description being defined according to a different second rigging control protocol and specifying a rigging control input and a rule for operating on the rigging control input to produce a rigging control output; writing the rigging control system description to a data file; and initiating transfer of the data file to a second application.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

FIG. 8 is a process flow diagram of an example of a method of rendering virtual content in relation to recognized objects.

FIG. 9B illustrates an example telepresence session.

FIG. 10 illustrates an example of an avatar as perceived by a user of a wearable system.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person (or creature or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

Embodiments of the disclosed systems and methods may provide for improved avatars and a more realistic interaction between a user of the wearable system and avatars in the user's environment. Although the examples in this disclosure describe animating a human-shaped avatar, similar techniques can also be applied to animals, fictitious creatures, objects, etc.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

Figure 1:
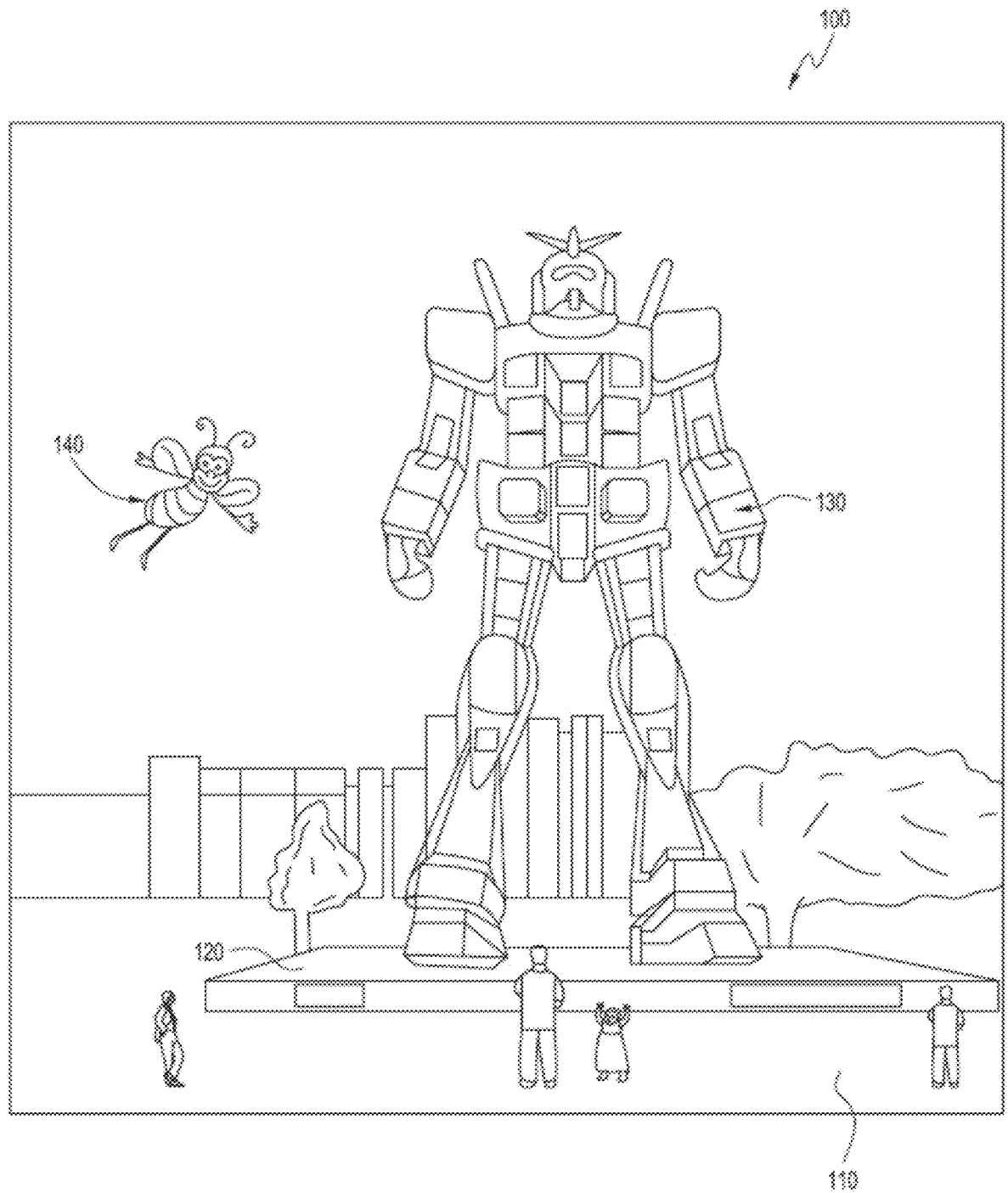
FIG. 1 depicts an illustration of a mixed reality scenario with certain virtual reality objects, and certain physical objects viewed by a person.

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
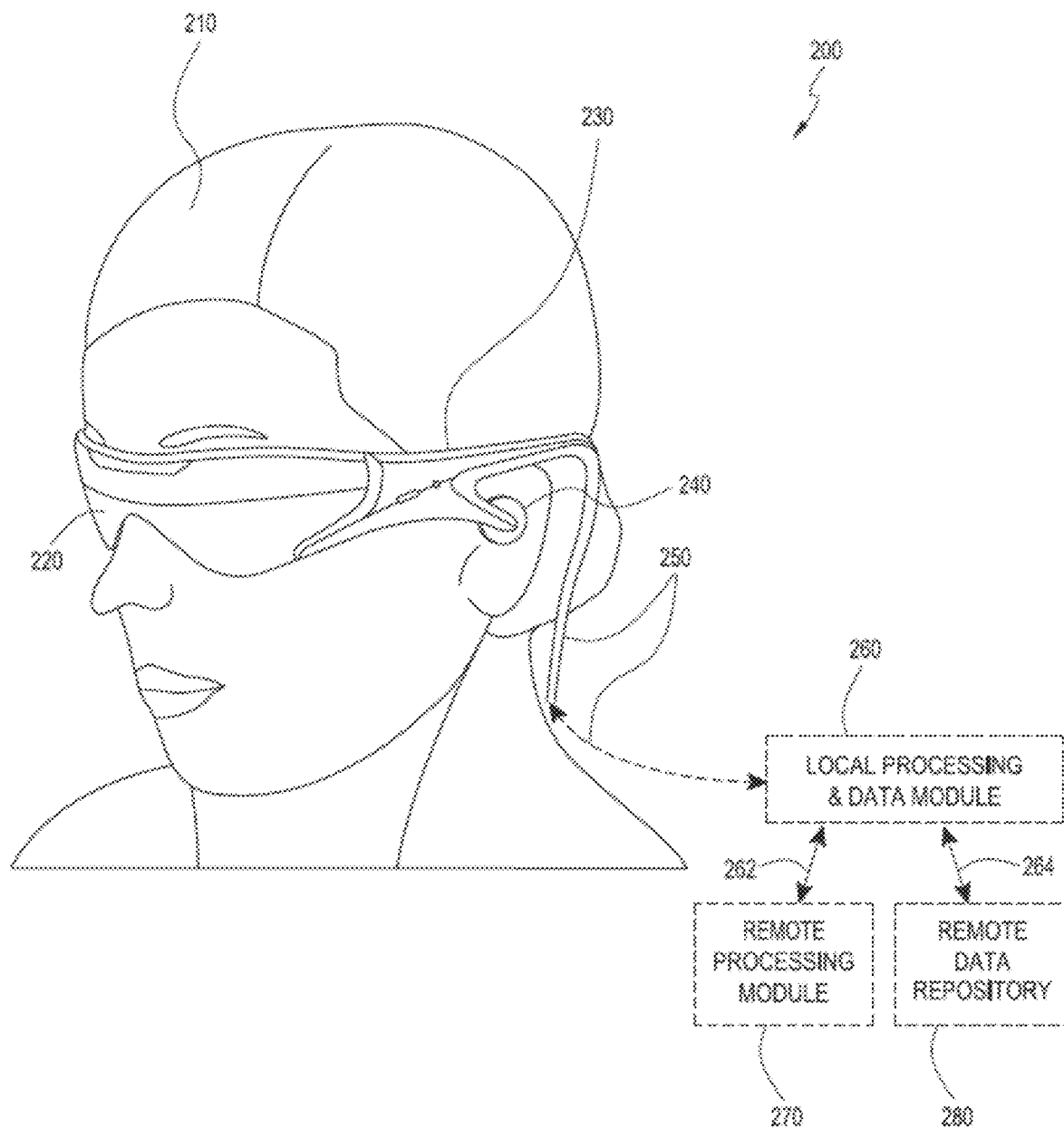
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of A Wearable System

Figure 3:
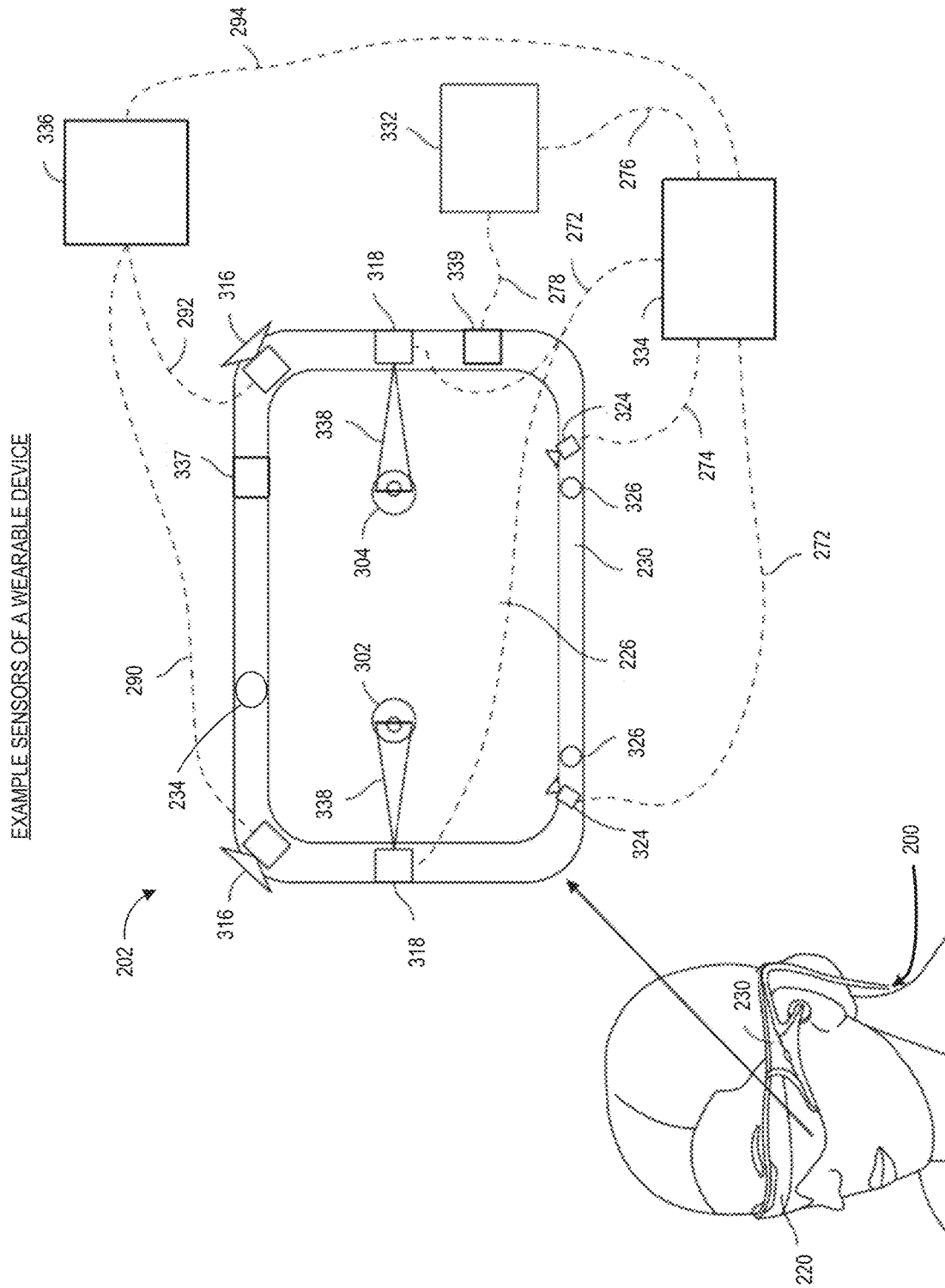
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
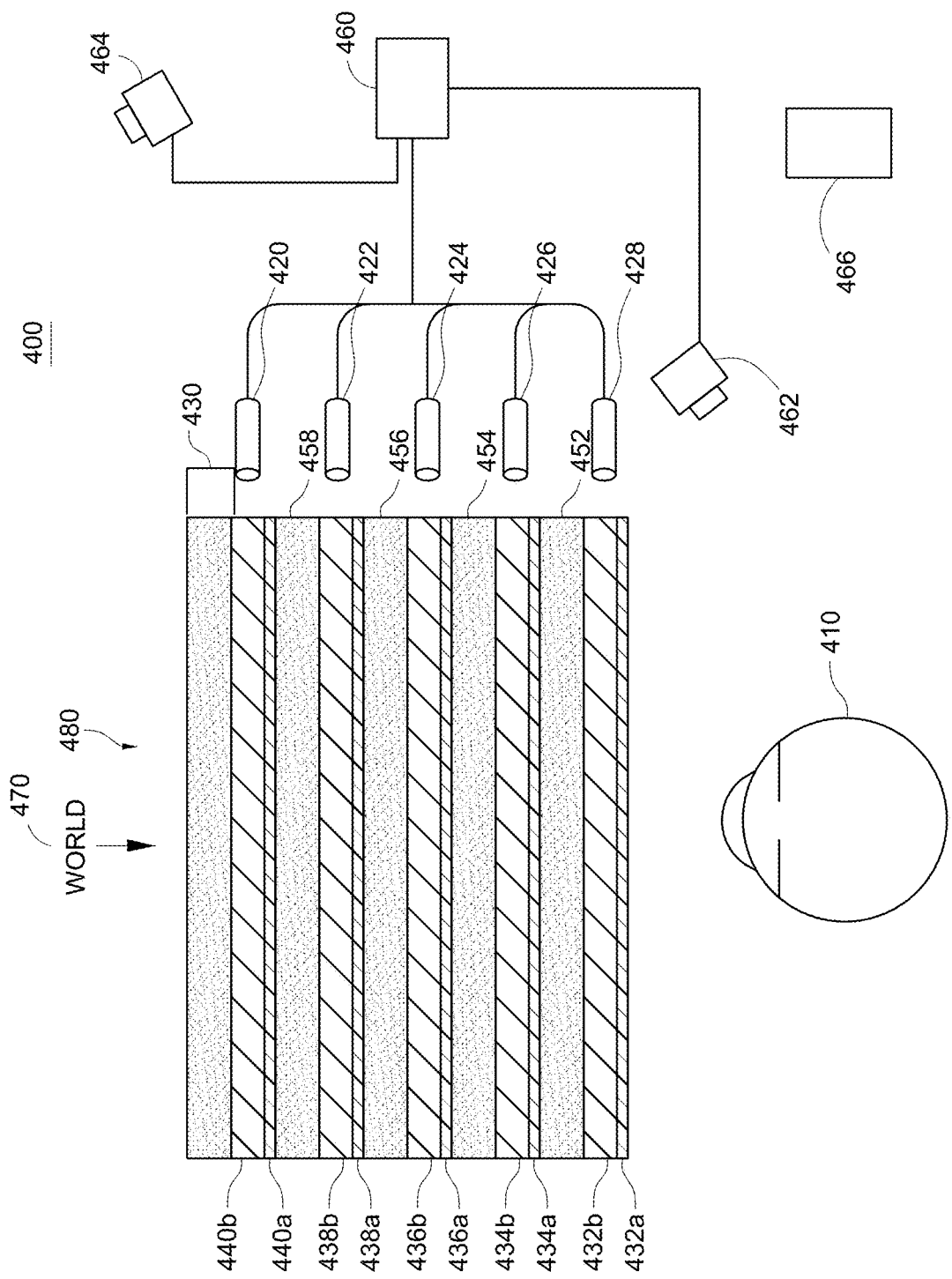
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUS, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with A Wearable System

Figure 5:
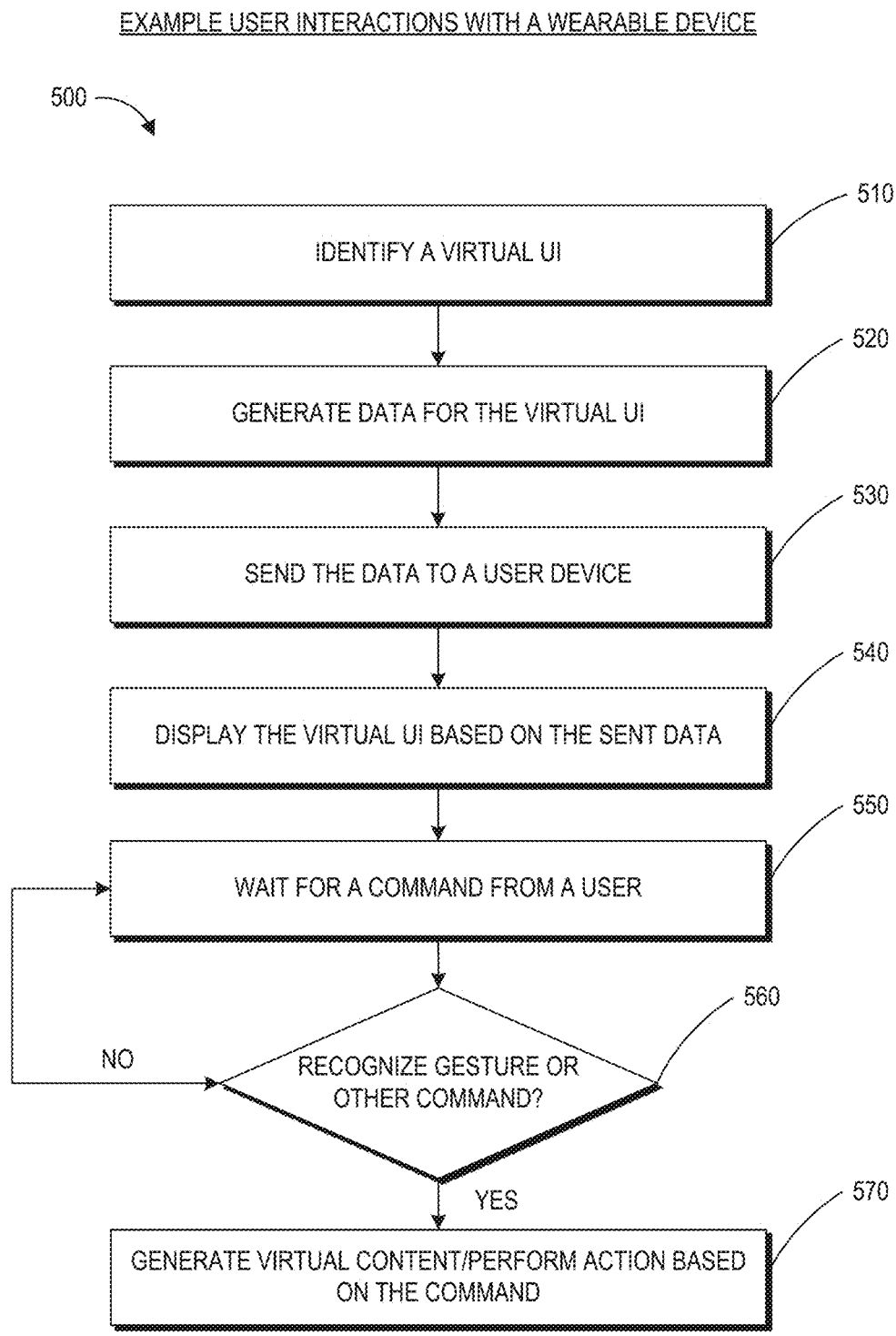
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
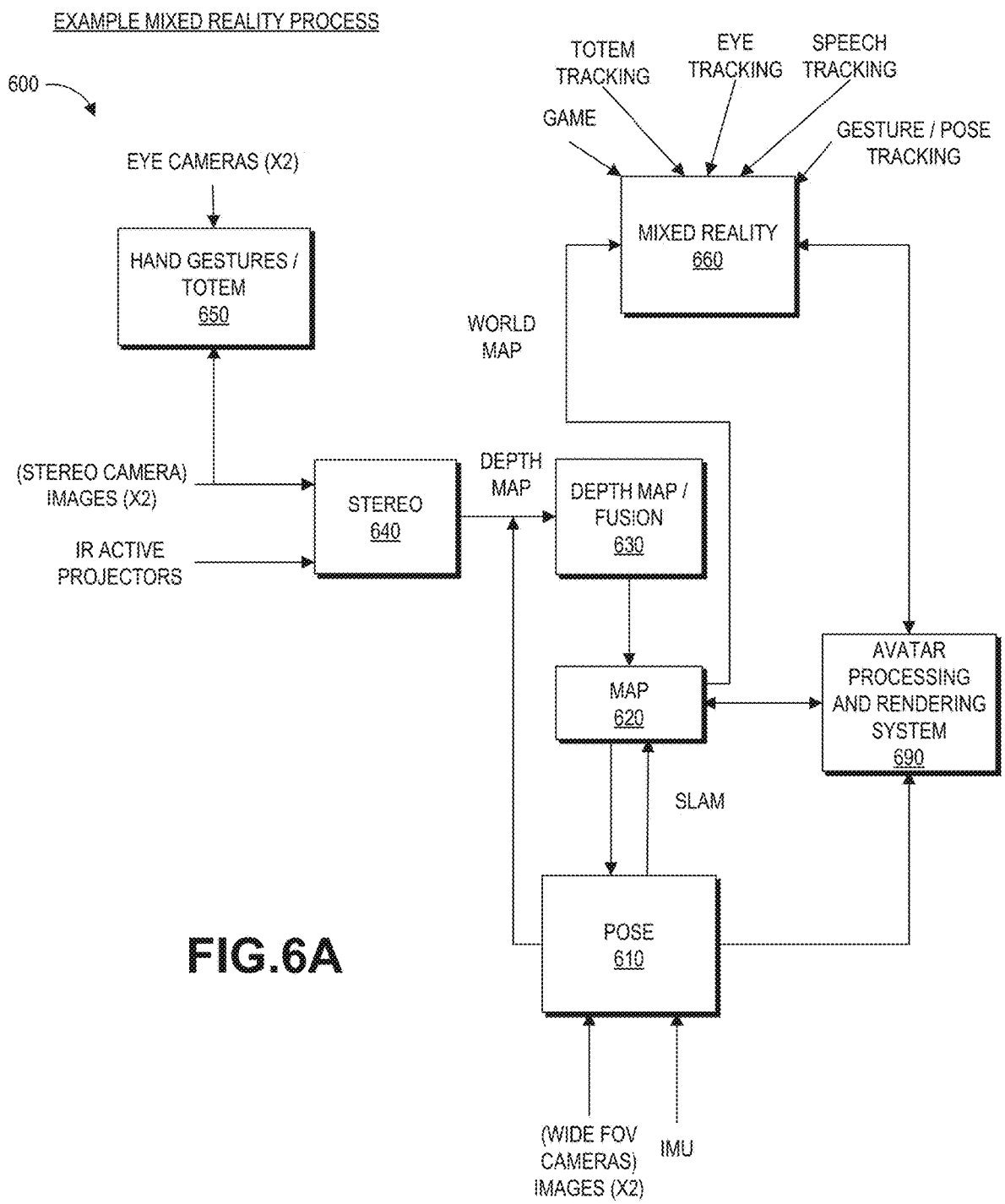
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
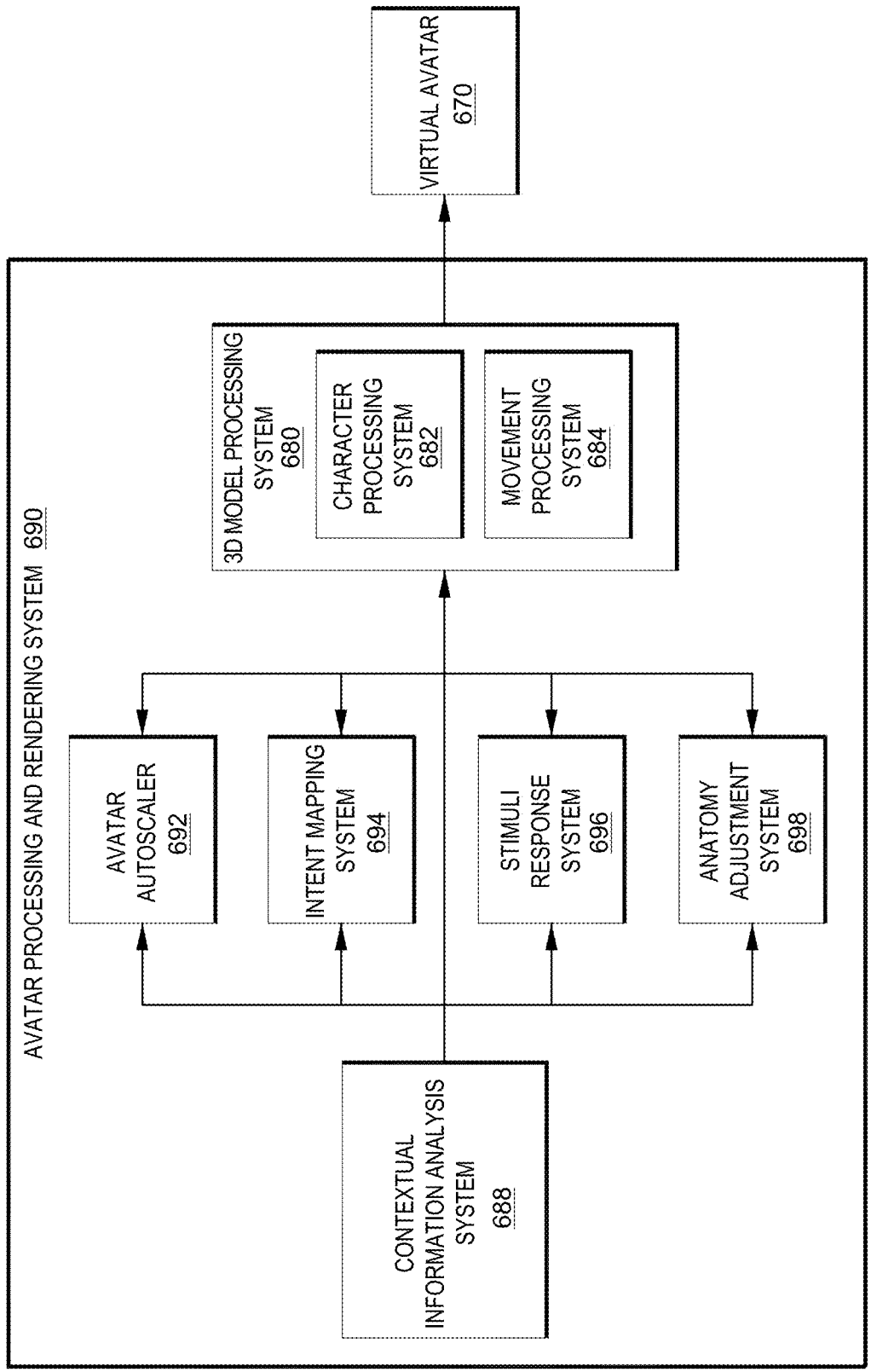
FIG. 6B illustrates example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping a User's Environment

Figure 7:
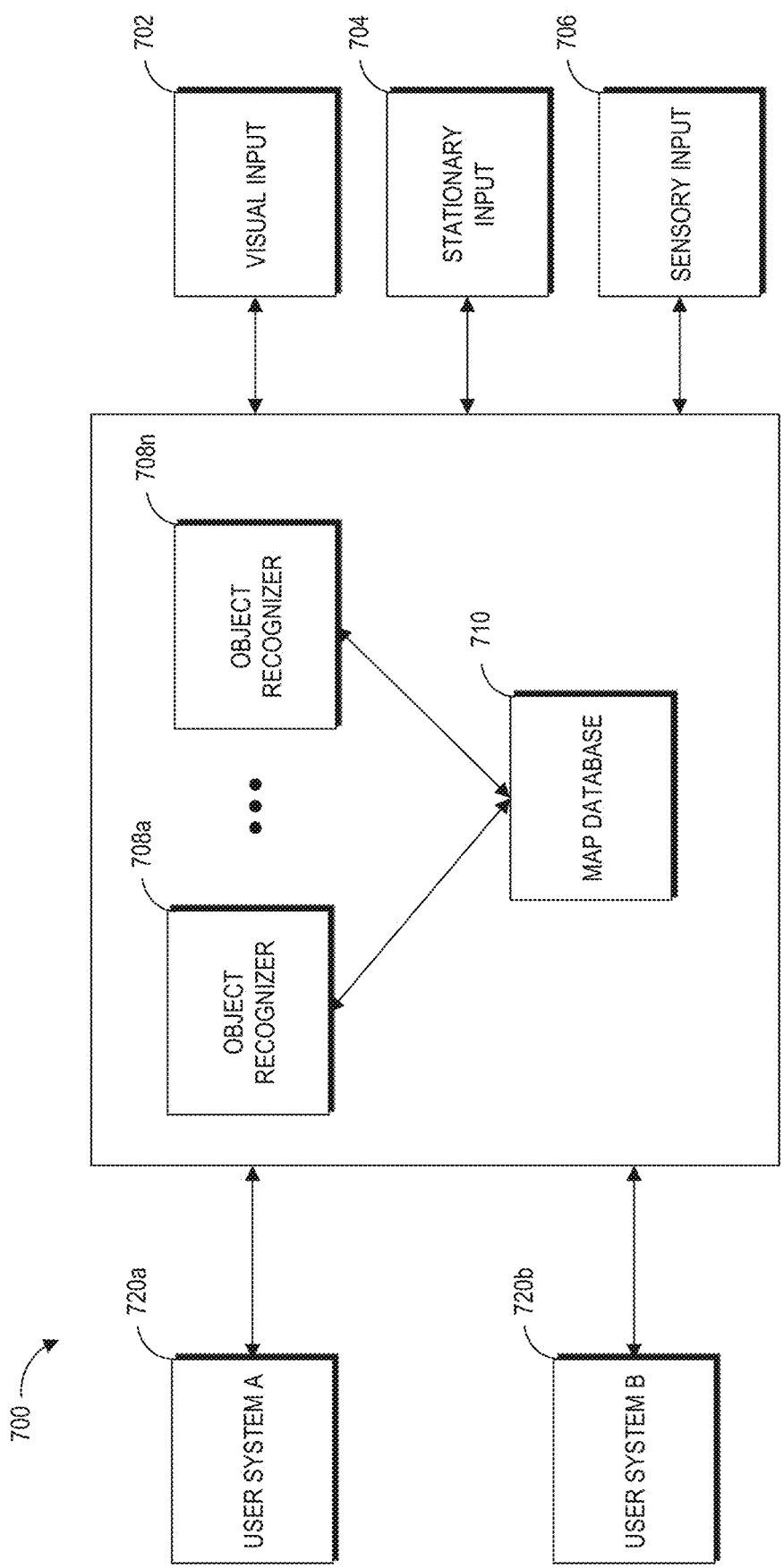
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as Ordinary Least Squares Regression), instance-based algorithms (such as Learning Vector Quantization), decision tree algorithms (such as classification and regression trees), Bayesian algorithms (such as Naive Bayes), clustering algorithms (such as k-means clustering), association rule learning algorithms (such as a-priori algorithms), artificial neural network algorithms (such as Perceptron), deep learning algorithms (such as Deep Boltzmann Machine, or deep neural network), dimensionality reduction algorithms (such as Principal Component Analysis), ensemble algorithms (such as Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications among Multiple Wearable Systems

Figure 9A:
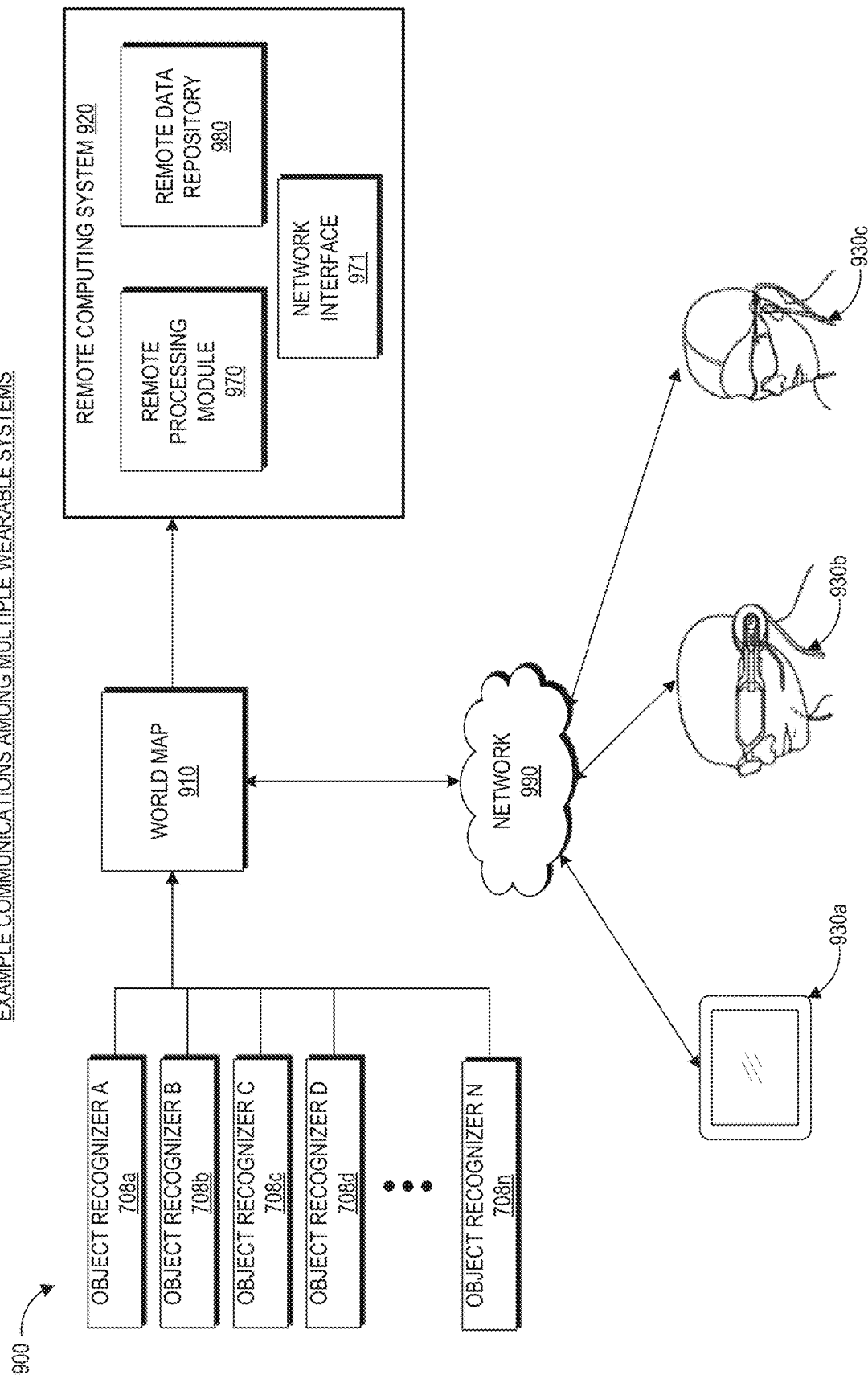
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some embodiments, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya® (available from Autodesk, Inc.) or Houdini® (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

The rigging for a virtual character can use skeletal systems to assist with mesh deformations. A skeletal system includes a collection of joints which correspond to points of articulation for the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause the child joint to move together with the parent joint.

A skeletal system for a virtual character can be defined with joints at appropriate positions, and with appropriate local axes of rotation, degrees of freedom, etc., to allow for a desired set of mesh deformations to be carried out. Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control. There can also be other types of higher-order rigging elements, such as higher-order blendshapes which are controlled by a lower-order rigging element.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which only includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights are assigned to those vertices for all of the influencing joints, with the sum of the weights for each vertex equaling 1. The positions of these vertices are changed based on transforms assigned to all of their influencing joints.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are averaged in proportion to the respective weights assigned to that vertex for each of the joints. There are well known limitations to LBS in practice, and much of the work in making high-quality rigs is devoted to finding and overcoming these limitations. Many helper joint systems are designed specifically for this purpose.

In addition to skeletal systems, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

The goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR system 200, while making as few compromises to the final quality as possible. In some embodiments, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

Examples of Systems and Methods for Facilitating Cross-Application Configurations of Virtual Characters As just discussed, the rigging for a virtual character can involve control systems for automated control of rigging elements (e.g., higher-order rigging elements) based on various inputs. And sometimes there are multiple, interleaved layers of control systems in the rigging for a particular virtual character. In the context of this disclosure, a rigging control system includes a set of one or more rules (e.g., logical rules, mathematical rules, etc.) which determines an output for controlling (e.g., regulating, adjusting, specifying, selecting, invoking, or otherwise impacting) a rigging element, such as a higher-order skeletal system or a higher-order blendshape, based on an input associated with a lower-order rigging element or other source. Since rigging control systems can be very complex, various tools have been created for authoring and implementing them. These tools typically utilize application-specific rigging control protocols. A particular rigging control protocol may include an application-specific set of data formats (including number types, text types, file types, units of measure, etc.), data structures, functions (including commands, mathematical operations, etc.), computational units (e.g., nodes, classes, etc.), and/or programming languages. When different applications use different rigging control protocols, it is not possible to directly transfer a rigging control system which has been authored in one application and then execute it in another application.

Digital content creation (DCC) applications are often used for developing the rigging, including rigging control systems, for virtual characters. One example of such a DCC application is Autodesk Maya®. A DCC application can provide various tools for defining rigging elements, such as polygon meshes, skeletal systems, blendshapes, etc., and for defining control systems for performing automated control of these rigging elements. The rigging control systems are built in the DCC application using its application-specific rigging control protocol.

Although DCC applications are well-suited for creating virtual characters and their associated rigging, they are typically not well-suited for real-time display of virtual characters (including real-time execution of the associated character rigging) in a game or VR/AR/MR application, for example. Instead, real-time engines have been developed for this purpose. One example of such a real-time engine is the Unreal® Engine available from Epic Games. Real-time engines are primarily designed to display finished rigging assets and are not well-suited to authoring sophisticated rigging assets. While real-time engines can include tools for creating rigging elements and/or rigging control systems, they are usually not as robust as those which exist in DCC applications; it is significantly easier to specify, build, and test new rigging assets, including rigging control systems, in a DCC application. Thus, real-time engines typically rely on DCC applications to provide virtual characters and their associated rigging. This requires rigging assets to be transferred from a DCC application to a real-time engine.

Tools, such as the Filmbox (FBX®) format, exist for transferring meshes, blendshapes, skeletal systems, and animations between applications. However, no similar tool exists for transferring rigging control systems between applications. While meshes, blendshapes, skeletal systems, and animations can be well-defined in formats which can easily be ported between applications, a rigging control system is typically tightly coupled to a specific application's data structures and conventions (e.g., the rigging control protocol used by the authoring application). Transferring rigging control systems from an authoring application to a real-time application therefore requires re-implementing the control systems in the real-time application environment in much the same way a software developer might re-implement an algorithm in multiple software languages to run in multiple applications and/or on multiple computing platforms. However, re-implementing the rigging control systems for a virtual character can be a very difficult, time-consuming, and expensive proposition due to their complexity and the difficulty of validating parities between applications.

Systems and methods are described herein for advantageously implementing rigging control systems with cross-application functionality and transferability. As discussed further herein, this can be accomplished by providing a framework that can be embedded in an application, such as a DCC application or a real-time engine. The embedding application, whether it be a DCC application or a real-time engine, can implement rigging control systems according to a first rigging control protocol (e.g., the rigging control protocol that is native to that particular application). Meanwhile, the embedded framework can implement rigging control systems according to a different second rigging control protocol.

The embedded framework can receive rigging control input(s) from the embedding application. The rigging control input(s) can represent, or otherwise be associated with, a request for a particular behavior from the rigging for a virtual character. The requested behavior can be, for example, a particular character movement. The embedded framework can then convert the rigging control input(s) so as to be compatible with the second rigging control protocol which is used by the embedded framework. For example, the embedded framework can convert rigging control input values into mathematical representations which are supported in the second rigging control protocol. The embedded framework can include a rigging control evaluation system which then determines one or more rigging control outputs by using the rigging control input(s) to evaluate the rigging control system(s). The rigging control output(s) can then be converted by the embedded framework so as to be compatible with the first rigging control protocol of the embedding application. For example, the embedded framework can convert rigging control output(s) into mathematical representations which are supported in the first rigging control protocol, which is native to the embedding application. The embedded framework can then pass the rigging control output(s) to the embedding application to be used to manipulate the virtual character according to the behavior requested by, or otherwise associated with, the rigging control input(s).

A developer can use an authoring application programming interface (API) for designing and building rigging control systems in the embedded framework according to the second rigging control protocol. The rigging control systems can be defined using a control system description language. The authoring API may be designed to interface with, or be part of, the embedded framework. Using the authoring API of the embedded framework, rigging control systems can be authored according to the second rigging control protocol while still using design tools offered by a DCC application in which the framework is embedded.

The embedded framework can write and read descriptions of the rigging control systems to and from data files. In some embodiments, this can be done using a serialization tool. For example, the rigging control system descriptions for a virtual character—which are defined according to the second rigging control protocol using the control system description language of the embedded framework—can be outputted in a data file which can be transferred from an authoring application, such as a DCC application, to a recipient application, such as a real-time engine.

The recipient application, too, can include an embedded framework that implements rigging control systems according to the second rigging control protocol. For example, the embedded framework in the recipient application can include a rigging control evaluation system which evaluates rigging control systems that are defined using the same control system description language that is used by the embedded framework in the authoring application. In addition, like the embedded framework in the authoring application, the embedded framework in the recipient application can translate the rigging control input(s) from the recipient application so as to be compatible with the second rigging control protocol. The rigging control evaluation system of the embedded framework in the recipient application can then use the input(s) to evaluate the rigging control system(s) and the framework can translate the rigging control output(s) so as to be compatible with the native rigging control protocol of the recipient application. The recipient application can then use the rigging control output(s) to manipulate the virtual character.

According to these systems and methods, a developer can advantageously develop and test the rigging control system(s) for a virtual character in an authoring application, such as a DCC application, which is well-suited to that purpose. The developer can then transfer the virtual character's rigging elements, including rigging control systems, to be displayed by another application, such as a real-time engine, which is well-suited to that purpose. In this way, cross-application authoring, transfer, and execution of rigging control systems for virtual characters can be achieved.

Example Computing Environment for Cross-Application Rigging Control Systems

Figure 11:
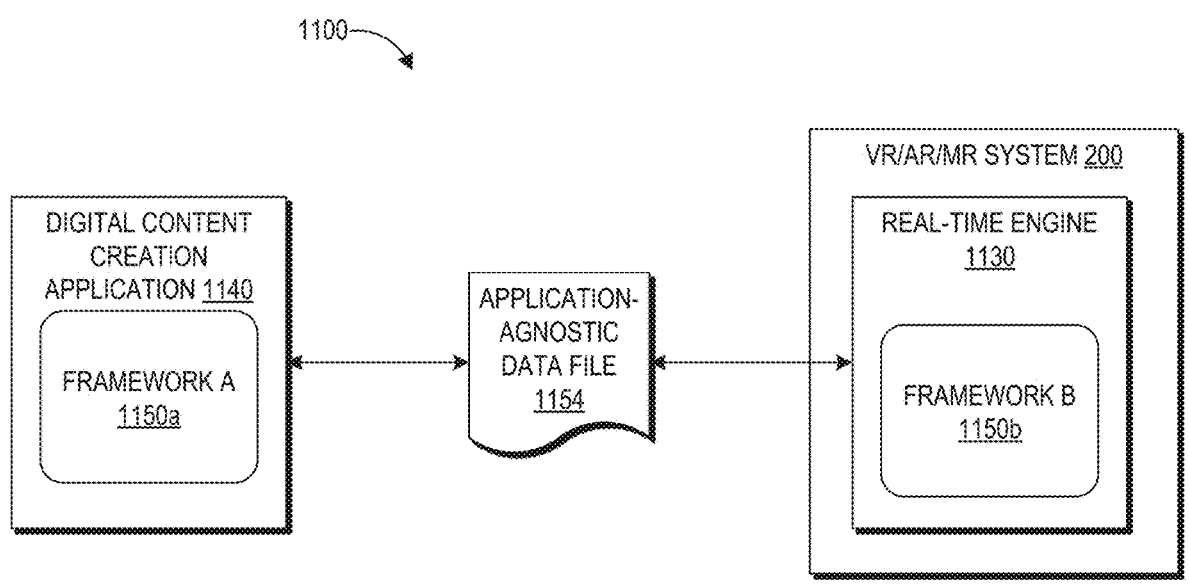
FIG. 11 illustrates an example computing environment for cross-application implementations of rigging control systems.

FIG. 11 illustrates an example computing environment 1100 for cross-application implementations of rigging control systems. The example computing environment 1100 includes a DCC application 1140 and a wearable VR/AR/MR device 200 with a real-time engine 1130. An example of the wearable VR/AR/MR device 200 is described herein with respect to FIG. 2. The DCC application 1140 and the real-time engine 1130 can each be implemented as software executing on one or more computing devices which may have central processing units (CPU), graphics processing units (GPU), memory devices, and/or data stores.

The DCC application 1140 can be a computer application for creating, animating, modeling, simulating, and rendering rigging assets for virtual characters. These rigging assets may be used in VR/AR/MR applications, film, television, game development, etc. to provide realistic and high fidelity animated virtual characters. The DCC application 1140 can include various tools to allow a developer to define rigging assets which make up an animated virtual character. For example, a developer can use the DCC application 1140 to define a vertex mesh for the character, to create skeletal systems, and to skin the character to create realistic movements with mesh deformations. A developer can also use the DCC application 1140 to define one or more rigging control systems for the virtual character. A rigging control system can include a set of one or more rules (e.g., logical rules, mathematical rules, etc.) which determines an output for controlling (e.g., regulating, adjusting, specifying, selecting, invoking, or otherwise impacting) a rigging element based on an input. The rigging control input could be one or more values associated with a lower-order rigging element, such as a core skeleton, or other source. Meanwhile, the rigging control output could be one or more values to control higher-order rigging elements, such as higher-order skeletal systems, higher-order blendshapes (e.g., correctives), etc.

Examples of behaviors which can be controlled by rigging control systems include the following: controlling movement of a virtual character's muscles, hair, or clothing based on the transforms (e.g., rotations) applied to the character's core skeleton; controlling the gaze direction of a virtual character's eyes, or the location of a body part of the character, based on the location of an object; and controlling movements, gestures, and/or expressions of a virtual character based on feedback (e.g., from cameras or other sensors) regarding the movements, gestures, expressions, or other sensed physiological characteristics of a human user. Many other controlled behaviors are also possible.

The DCC application 1140 may use a first rigging control protocol, including an application-specific set of data formats, data structures, functions, computational units (e.g., nodes, classes, etc.), and/or programming languages for defining rigging control systems. For example, the DCC application 1140 may include a node-based structure for defining and evaluating rigging control systems. Each of the nodes can implement one or more rigging control tasks.

The VR/AR/MR system 200 can execute an application which utilizes a virtual character. The application can be, for example, a game application or a telepresence application with a virtual avatar. The VR/AR/MR system 200 can display the virtual character using the real-time engine 1130. The real-time engine 1130 can display the virtual character by implementing and/or evaluating its rigging elements, including meshes, skeletal systems, blendshapes, animations, rigging control systems, etc.

The DCC application 1140 can include Framework A 1150*a* and the real-time engine 1130 can include Framework B 1150*b*. In some embodiments, these frameworks 1150*a*, 1150*b* may be specific to the respective application in which they are embedded. The frameworks 1150*a*, 1150*b* can collectively enable cross-application authoring, transfer, and execution of rigging control systems for the virtual character. The frameworks 1150*a*, 1150*b* can be respectively integrated into the DCC application 1140 and the real-time engine 1130 as, for example, plug-ins. In some embodiments, the DCC application 1140 is Autodesk Maya® and the real-time engine is Epic's Unreal® Engine.

In some embodiments, Framework A in the DCC application 1140 can create a data file 1154 which defines the rigging control systems for the virtual character. The data file 1154 can also include other rigging assets, such as vertex meshes, skeletal systems, blendshapes, animations, etc. The data file 1154 can be communicated between the DCC application 1140 and the real-time engine 1130 via a communication link. Framework B in the real-time engine 1130 can then use the data file 1154 to implement the rigging control systems to be used when displaying the virtual character.

Example Framework for Transferring Control Systems

Figure 12:
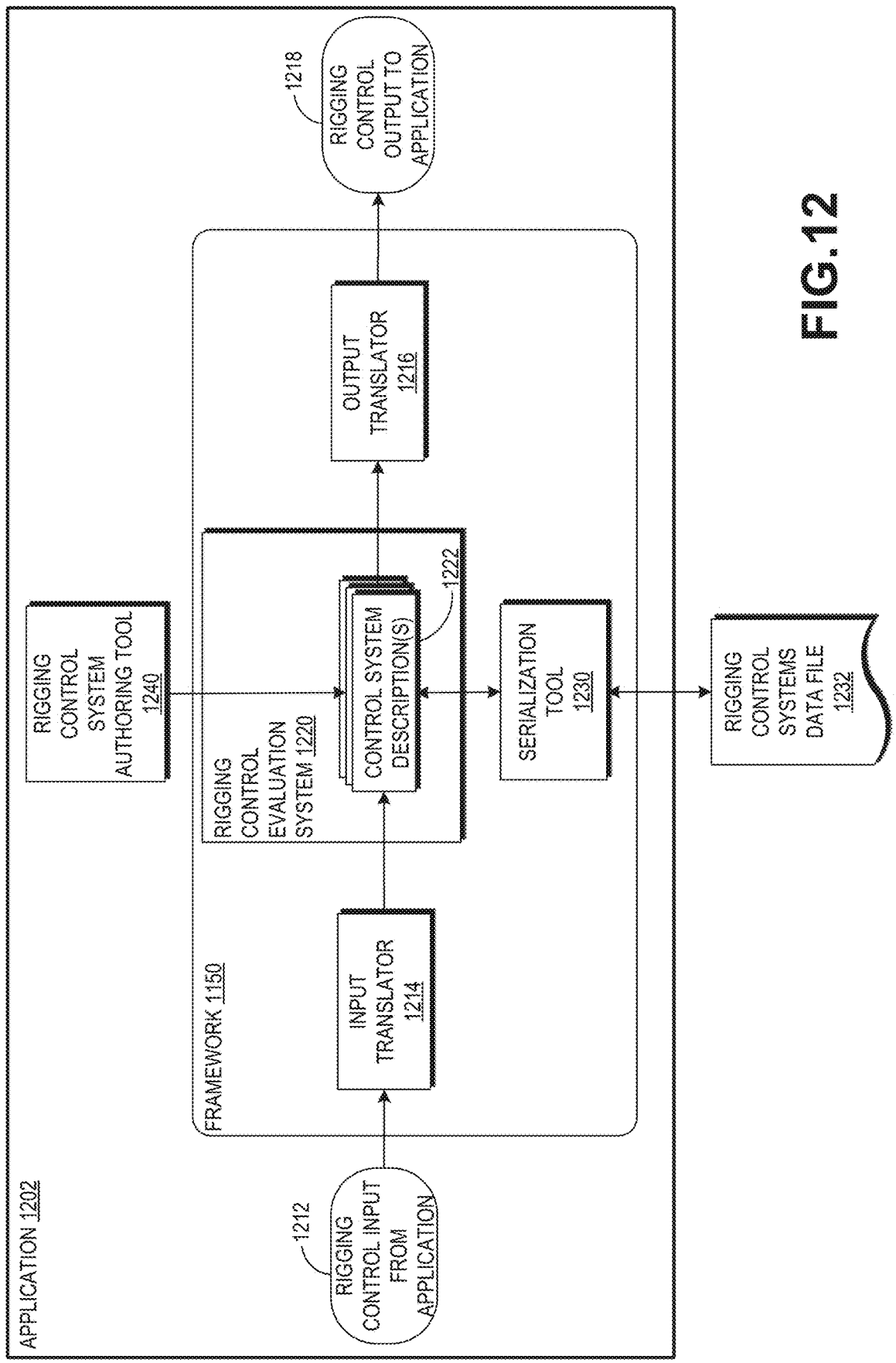
FIG. 12 illustrates an example of an embedded framework that can be used for cross-application authoring, transfer, and evaluation of rigging control systems for a virtual character.

FIG. 12 illustrates an example of an embedded framework 1150 that can be used for cross-application authoring, transfer, and evaluation of rigging control systems for a virtual character. The framework 1150 can be embedded (e.g., as a plug-in) in an application 1202, such as a DCC application 1140 or a real-time engine 1130. The application 1202 can implement rigging control systems according to a first rigging control protocol, while the framework 1150 implements rigging control systems according to a different second rigging control protocol. The framework 1150 can receive a rigging control input from the application 1212, process the input through a rigging control evaluation system 1220, and provide a rigging control output to the application 1218.

Rigging Control System Description Language

The framework 1150 can define and evaluate rigging control systems in accordance with a rigging control protocol which is different from the native protocol used by the application 1202. In the rigging control protocol used by the framework 1150, rigging control systems can be defined using a rigging control system description language. The rigging control system description language can specify the inputs and outputs for a rigging control system. The description language can also specify supported data types for the inputs and outputs. These may include integers, floating point values, Boolean values, strings, etc. The rigging control system description language can also define supported mathematical objects, such as XYZ vectors and quaternion values, which can be operated on by rigging control systems.

The rigging control system description language can also define mathematical and/or logical rules which can operate on supported inputs. The rules can be, for example, mathematical functions. Common mathematical functions and rigging domain-specific functions can be supported. The rules can involve simple operations, such as performing arithmetic or Boolean logic on one or more rigging control inputs. Alternatively, the operations can be complex, such as evaluating a radial basis function using a set of core skeleton joint rotations as inputs, and outputting blendshape weights and/or deltas based on the pose of the core skeletal system. Many other operations are also possible. New functions can be created by defining them using any of a variety of programming languages, such as C++ or Python, and registering them using the authoring tool 1240. The rigging control system description language can be character rig-agnostic in that the language can be used to define rigging control systems for any type of virtual character.

Rigging Control System Description(s)

The rigging control system description language can be used to create rigging control system descriptions 1222. The rigging control system descriptions 1222 define the logic associated with a given rigging control system. For example, the rigging control system descriptions can describe logic for controlling the movement and/or other behavior of a virtual character, given one or more input values, such as by determining blendshape weights, transforms for helper joints, etc. Each rigging control system description 1222 can include, for example, a set of one or more mathematical/logical rules or operations to be evaluated using a designated rigging control input 1212. Some of these rules can receive the output from another rule as their inputs. The control system descriptions collectively define the rigging control behaviors associated with the rig for a particular virtual character and are therefore character rig-specific. However, the rigging control system description(s) can be application-agnostic in that they can be transferred between a first application and a second application and can be used by either, so long as the application includes the embedded framework 1150. The rigging control system descriptions 1222 can be implemented using a rigging control system description language, which can be any suitable computer programming language, including a custom language.

Rigging Control System Authoring Tool

A rigging control system authoring tool 1240 can be provided for use in generating the rigging control system descriptions 1222. The authoring tool 1240 can provide an API that can be called by the application 1202 so that the design tools in the application 1202 can be used for designing rigging control system descriptions 1222. The authoring tool can translate or otherwise convert rigging control system descriptions from the embedding application 1202 to the control system description language used by the framework 1202. The authoring tool 1240 may be built with various programming languages. Where the authoring tool 1240 is built using the Python programming language, the authoring tool 1240 can utilize Python's native ability to extend mathematical notations to new types.

Rigging Control Evaluation System

The framework 1150 can also include a rigging control evaluation system 1220. The rigging control evaluation system 1220 can be independent of the application 1202 and can operate according to a different rigging control protocol. Thus, it may include data structures and use mathematical representations that are different from those used by the application 1202. The rigging control evaluation system 1220 can utilize rigging control input values supplied by the framework 1150 to determine (e.g., calculate, look-up, etc.) one or more rigging control output values by evaluating one or more rigging control systems specified by the control system description(s) 1222. The rigging control evaluation system 1220 then provides a resulting output to the framework 1150. In some embodiments, the rigging control evaluation system 1220 is a node-based system, and the rigging control system descriptions can be implemented as one or more nodes. The rigging control evaluation system 1220 is character rig-agnostic in that it can evaluate control system descriptions 1222 for any virtual character. The rigging control evaluation system 1220 can be implemented using any suitable computer programming language, such as, for example, the C++ language.

Framework

The framework 1150 can provide an encapsulation of the rigging control evaluation system 1220. Since the rigging control evaluation system 1220 uses a rigging control protocol which is different from the native rigging control protocol used by the embedding application 1202, the framework 1150 can include translators 1214, 1216 for converting rigging control inputs 1212 and outputs 1218 to be compatible with the respective rigging control protocols as the inputs and outputs are passed between the application 1202 and the framework 1150. For example, the input translator 1214 can translate a rigging control input 1212 from the application 1202 so as to be compatible with the rigging control protocol used by the rigging control evaluation system 1220. Meanwhile, the output translator 1216 can translate a rigging control output from the rigging control evaluation system 1220 so as to be compatible with the rigging control protocol used by the embedding application 1202.

In some embodiments, the translators 1214, 1216 can convert rigging control inputs and outputs from one mathematical representation to another. For example, Autodesk Maya® does not natively support the use of quaternions for calculating rotations. Instead, Autodesk Maya® calculates rotations using Euler angles. However, the use of quaternions may be preferred in the rigging control protocol used by the rigging control evaluation system 1220. Therefore, the framework 1150 which is designed for use in Autodesk Maya® can use the input translator 1214 to convert Maya-native Euler angles into quaternion representations for use by the rigging control evaluation system 1220. In some embodiments, the operation of the output translator 1216 is the inverse of the operation performed by the input translator 1214. For example, the output translator 1216 can convert quaternion output values from the rigging control evaluation system 1220 into Euler angles for use by Maya®. Similar translation mechanisms can also be used in other applications.

The translators 1214, 1216 can also perform translation operations which are not mathematical. For example, the input translator 1214 can convert data from a format used by the application 1202 to a format used by the framework 1150 (e.g., convert a text string from American Standard Code for Information Interchange (Ascii) format to Unicode format, or vice versa), while the output translator 1216 can convert data back to the format used by the application 1202. In addition, since some data structures, such as matrices, hierarchical data, maps, etc., can be application-specific, the input translator 1214 can also convert a data structure used by the application 1202 to a new data structure, or a modified data structure, used by the framework 1150 (e.g., convert matrices from sparse to more dense representations, or vice versa), and the output translator 1216 can convert that data structure back to the one used by the application 1202.

The rigging control input 1212 may be, for example, a joint transform (e.g., a rotation or translation), a blendshape weight, or a value from a sensor. But there are many other types of inputs that can also serve as the rigging control input 1212. In some embodiments, the rigging control input 1212 can be associated with a lower-order rigging element. For example, the rigging control input 1212 could define a characteristic of the lower-order rigging element. As an illustrative example, the rigging control input may be one or more transforms (e.g., rotations) that are to be applied to one or more joints in a lower-order skeletal system, such as the core skeleton. The rigging control input 1212 could also be determined by a control system associated with a lower-order rigging element. Or, the rigging control input 1212 could come from a source other than one associated with a lower-order rigging element. For example, the rigging control input 1212 could come from a camera or other sensor that captures a movement, pose, or physiological characteristic from a user and then provides an input to a virtual character's rigging to mimic or otherwise respond to the movement, pose, or physiological characteristic from the user. As one example, the sensor could detect blood flow to the user's face to determine when the user is blushing. An input can then be provided to the virtual character's rigging to mimic or otherwise respond to the blushing of the user.

Additional examples of rigging control inputs 1212 include the following: an input which is indicative of a state of some character or thing in a game or application (e.g., in a fighting game, a character damage value could be used as a rigging control input to adjust the character's motion when hurt, to add damage deformations, such as bruises or swelling, or to change the virtual character's costume or appearance); an input which activates, deactivates, or modifies a particular virtual character behavior based on some criterion (e.g., a virtual character's eyes could be switched from being controlled by animation to being controlled to perform a behavior such as looking at some other character or object based on an alpha value in the range from 0 to 1 which transitions between the animated state and a controlled state); an input which is indicative of performance by the real-time engine 1130 (e.g., if frame rate drops below some lower threshold, a rigging control input value could be provided to temporarily deactivate some portion of the rigging for a virtual character in order to allow the game application to maintain a desired range of latency); or an input which activates a computationally-intensive higher-order rigging element based on some criterion (e.g., only activating an element of a facial rig when the user is looking closely at the virtual character's face). Many other example rigging control inputs 1212 are also possible.

The rigging control output 1218 can be used to control a rigging element, such as a higher-order rigging element. For example, the rigging control output could be one or more transforms (e.g., rotations) to be applied to one or more joints (e.g., helper joints) in a higher-order skeletal system. The rigging control output could alternatively control a blendshape, such as by invoking the blendshape, providing deltas for the blendshape, and/or providing a weight value for applying the blendshape. The rigging control output can also be one that controls some aspect of a game or other application based on a rigging control system operation. For example, a rigging control system could control when a certain game element, sound, or haptic feedback is deployed. There are also many other types of rigging control outputs.

The framework 1150 can be application-specific in that it can be designed to be interoperable with the design principles of the embedding application 1202, which may vary from application to application. For example, the input translator 1214, the output translator 1216, and/or the rigging control system authoring tool 1240 may vary depending upon the rigging control protocol used by the embedding application 1202. The framework 1150 is character rig-agnostic, however, in that it can be used to implement rigging control systems for any virtual character. The framework 1150 can be implemented using, for example, the same computer programming language used to implement the application 1202 (e.g., the C++ programming language, when the application 1202 is Autodesk Maya® or Epic's Unreal® Engine).

Serialization Tool

The framework 1150 can also include a serialization tool 1230 for importing or exporting a data file 1232 which includes the control system descriptions 1222. The data file 1232 can also include other rigging elements, such as meshes, skeletal systems, blend shapes, animations etc. Data serialization can be performed to format rigging elements such that they can be stored, transmitted, reconstructed, and used by multiple systems. The data file 1232 can be imported or exported to any application 1202 which includes an instance of the embedded framework 1150. Since the embedded framework 1150 uses the same rigging control protocol regardless of the application 1202 in which it is embedded, this ability to import or export rigging control system descriptions 1222 in the data file 1232 allows rigging control systems for a particular virtual character to be transferred from one application to another (e.g., from a DCC application to a real-time engine). The data file 1232 may have, for example, a comma-separated values (CSV) format, a JavaScript Object Notation (JSON) format, an Extensible Markup Language (XML) format, a YAML file format, combinations of the same, or the like. The serialization tool 1230 can be implemented using, for example, the same computer programming language used to implement the application 1202 or any other suitable language, such as the Python programming language.

Example Flow Diagram for Cross-Application Transfers of Rigging Control Systems

Figure 13:
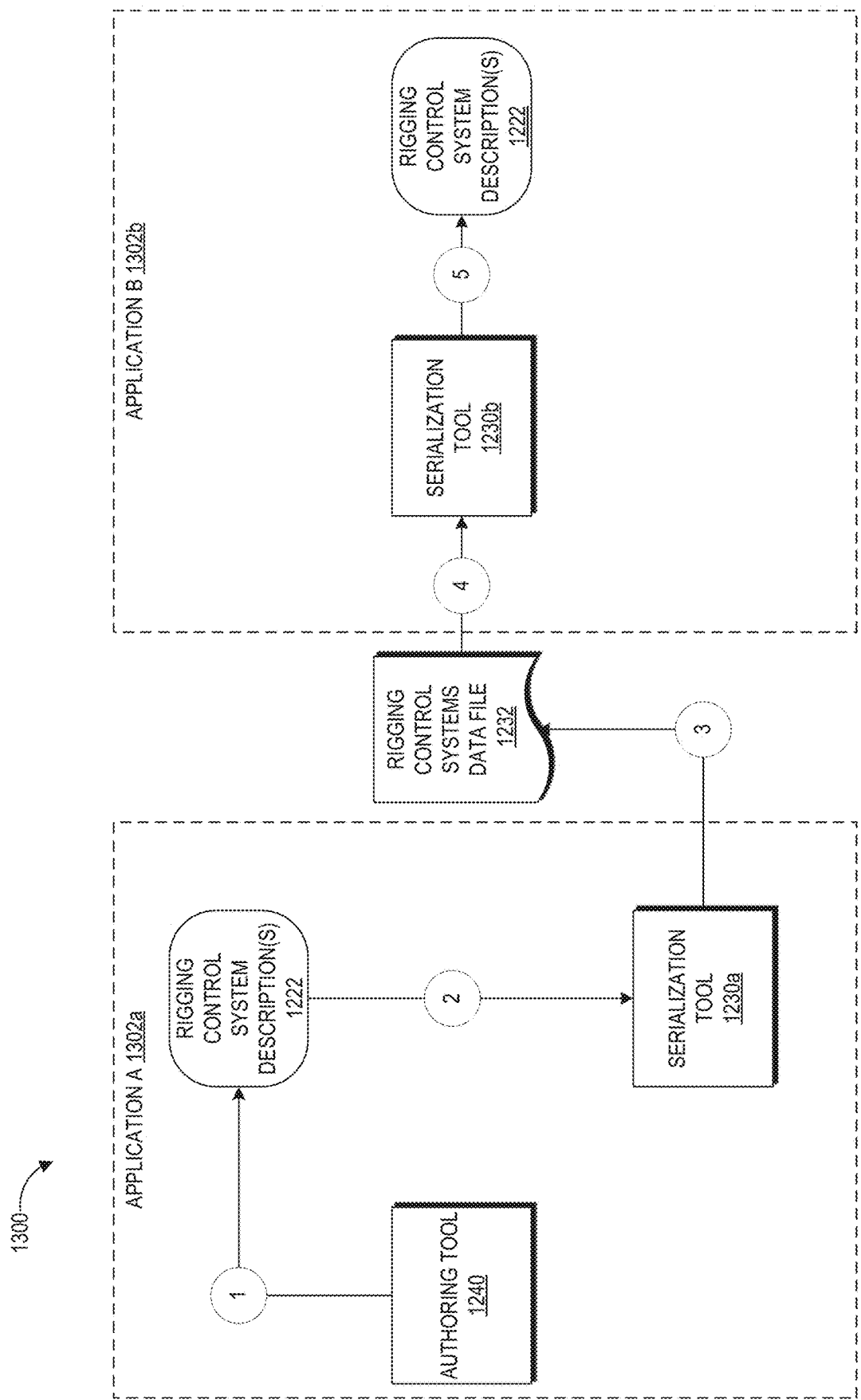
FIG. 13 illustrates an example flow diagram for cross-application transfer of rigging control systems.

FIG. 13 illustrates an example flow diagram for cross-application transfer of rigging control systems. The flow diagram 1300 involves two applications: Application A (1302a) and Application B (1302b). Applications A and B may respectively be any types of software tools capable of creating, editing, and/or displaying virtual characters and their associated rigging assets. In some embodiments, Application A is a DCC application, such as Autodesk Maya®, while Application B is a real-time engine, such as Epic Unreal®.

Instances of the framework 1150 can be embedded into both Application A and Application B. The framework 1150 can interface with the authoring tool 1240 for creating control system descriptions 1222 for a virtual character. The control system descriptions 1222 can be exported (or imported) by a serialization tool 1230 to achieve cross-application transfers of control system descriptions.

In the example flow diagram 1300 in FIG. 13, the authoring tool 1240, the serialization tools 1230a, 1230b, the rigging control system description(s) 1222, and the data file 1232 correspond to instances of the corresponding features in FIG. 12. The control system descriptions can be created in Application A and can later be used by Application B for controlling the rigging of the virtual character.

At (1), a developer can create rigging control system descriptions 1222 in Application A via the authoring tool 1240. The control system descriptions 1222 can be used and tested within Application A, as discussed with respect to FIG. 12. At (2), the control system descriptions 1222 for the virtual character can be extracted by the serialization tool 1230a. At (3), the serialization tool 1230a can write the control system description 1222 into the data file 1232. At (4), the data file 1232 can be imported into Application B by the serialization tool 1230b. At (5), Application B can load the control system description 1222 into the application's embedded framework (e.g., framework 1150a or 1150b). The control system descriptions 1222, once imported into Application B, can be invoked for displaying the virtual character. In embodiments where Application B can also create additional control system logic or edit the imported control system logic, the additional or edited control system logic can also be exported from Application B and imported by application A using similar techniques.

Example Processes for Cross-Application Transfers of Control Systems

Figure 14A:
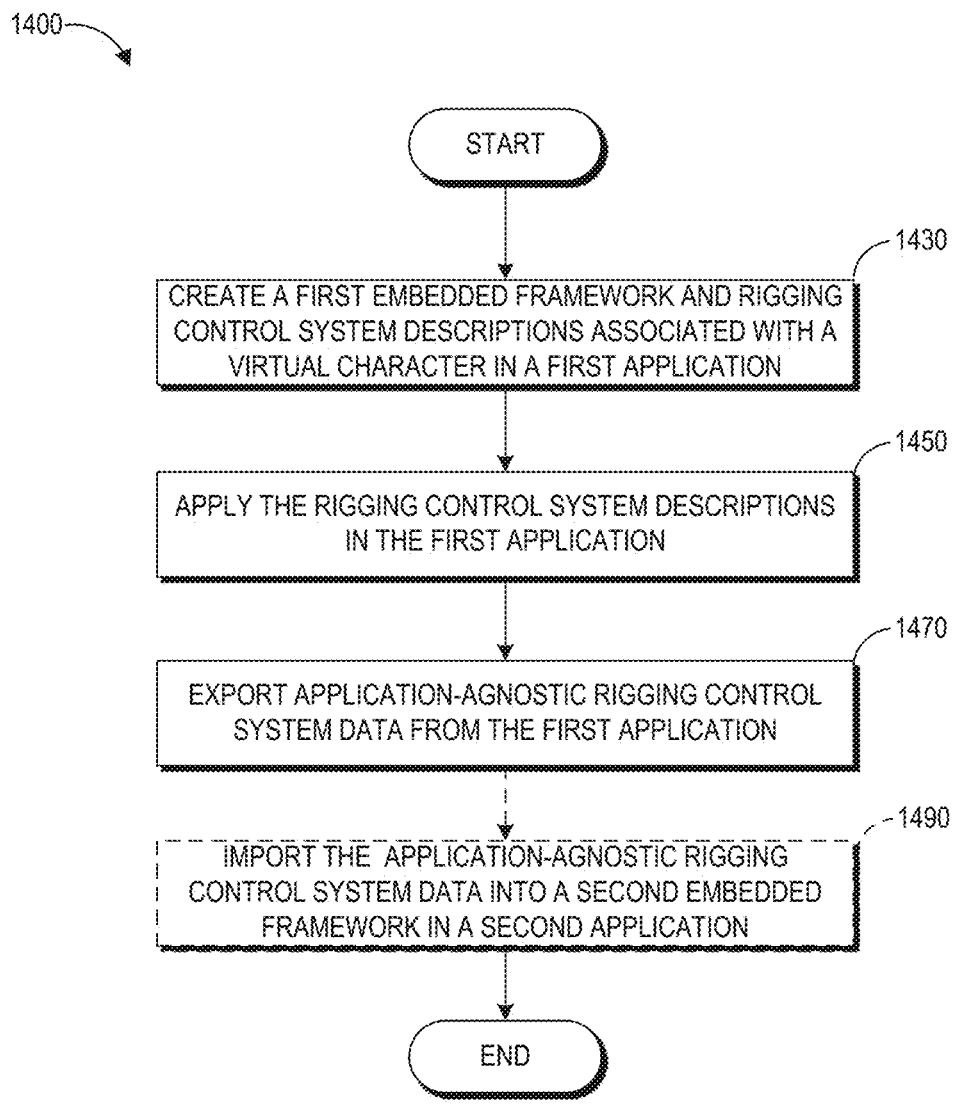
FIGS. 14A-14C illustrate example processes for cross-application authoring, transfer, and evaluation of rigging control systems.
Figure 14B:
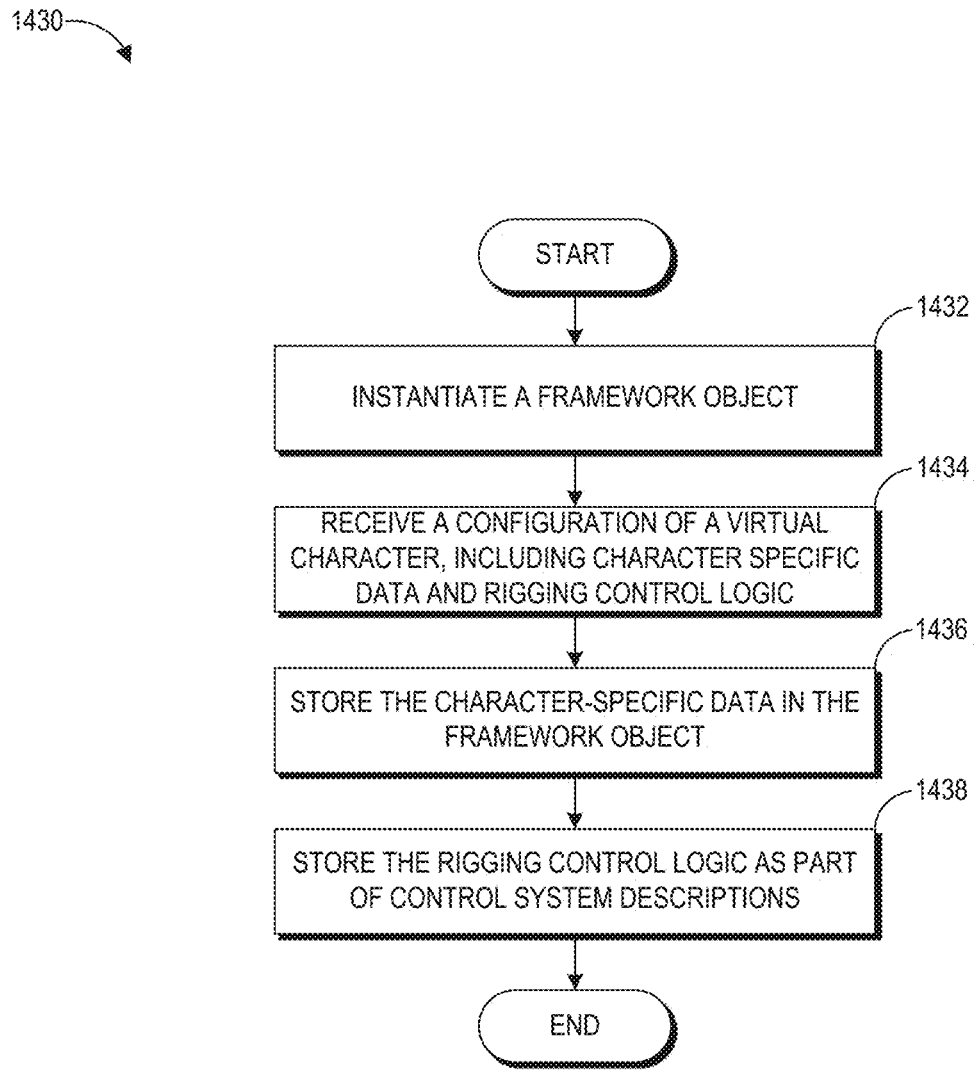
Figure 14C:
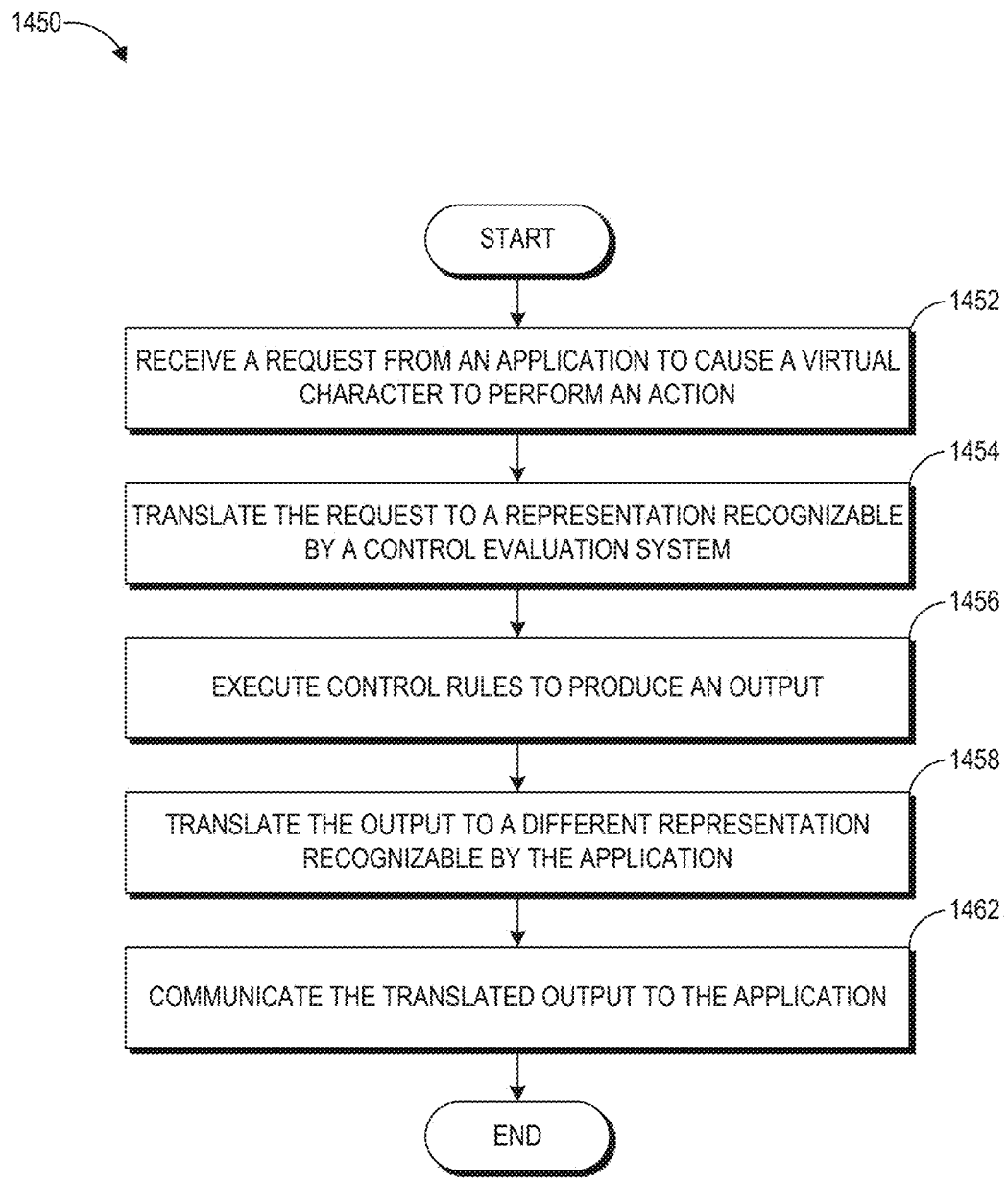

FIGS. 14A-14C illustrate example processes for cross-application authoring, transfer, and evaluation of rigging control systems. The example processes 1400, 1430, 1450 may be performed by one or more of the computing systems shown in FIG. 11.

In FIG. 14A, at block 1430 of the process 1400, the computing system can create a first embedded framework object for a first application. The computing system can also create control system descriptions associated with a virtual character in the first application. The first application may be a DCC application for authoring rigging assets for virtual characters. To create the first embedded framework in the first application, the computing system can load the embedded framework 1150 into the first application. The first embedded framework may be, for example, a plug-in for the first application. The plug-in can provide APIs which can be called by the authoring tools of the first application for creating rigging control systems for the virtual character. For example, the APIs can be used to set rigging control inputs, outputs, and rules associated with a behavior or action of the virtual character. The first embedded framework can be character-agnostic, and thus the APIs for the first embedded framework can be used to create the rigging control logic for various types of virtual characters.

FIG. 14B illustrates an example sub-process for block 1430 in the context of a DCC application having a node-based data structure. At block 1432, a developer can instantiate a framework object to contain character-specific data and to write rigging control logic for the virtual character. For example, the framework object can be created from the plug-in class in Maya®. At block 1434, assets and logic for a virtual character can be configured in the first application. For example, a developer can define and configure nodes associated with character-specific rigging control functions using authoring tools provided by the embedded framework and/or by the first application. As each node is completed, it can be automatically transferred to the embedded framework. At blocks 1436 and 1438, the configuration of the character, including character-specific rigging elements and control logic, can be stored in the framework object. The character-specific data can be invoked in the first application for testing the virtual character. The underlying rigging control logic can be stored as rigging control system descriptions, which can be exported to another application and can be used without needing to rewrite the rigging control system logic to be compatible with the native rigging control protocol of that application.

With reference back to FIG. 14A, at block 1450, the first application can utilize the rigging control system descriptions. For example, a developer can test the rigging control system descriptions and other rigging assets authored in the first application. As described with reference to FIG. 12, the first application can request a desired behavior from the character rig by providing rigging control inputs associated with the desired behavior. The rigging control inputs can be passed to the rigging control evaluation system of the embedded framework, which can produce rigging control output values and pass them back to the first application to implement the desired character behavior. The developer can perform this process repeatedly and can modify the control system descriptions via the authoring tool to attain the desired character behaviors.

FIG. 14C illustrates an example sub-process for the block 1450. This sub-process can be performed by the framework 1150 described in FIG. 12. At block 1452, the first application can request a desired behavior from the character's rig. The application can provide one or more rigging control inputs associated with the request to the embedded framework.

At block 1454, the embedded framework 1150 can take the rigging control input and translate it into a language, data structure, format, representation, etc. that is recognizable by the rigging control evaluation system 1220. As an example, the framework can translate control values in the request from one mathematical representation (e.g., Euler angles) to another (e.g., quaternions) which is recognizable by the rigging control evaluation system.

At block 1456, the rigging control evaluation system 1220 can use the translated input to evaluate a rigging control system description 1222 to produce a rigging control output. The rigging control system descriptions can be configured to implement both lower-order and higher-order rigging controls. In the case of higher-order rigging controls, the control inputs 1212 can be associated with lower-order rigging elements within the character rig and the control outputs 1218 can be used to control higher-order rigging elements. In the case of lower-order rigging controls, the control inputs 1212 can be provided from a source external to the character rig and the control outputs 1218 can be used to control lower-order rigging elements.

The rigging control evaluation system 1220 can take one or more rigging control inputs and can generate one or more rigging control outputs. The rigging control outputs can be used to control rigging elements beyond the part of the character's rig that is directly associated with the input. For example, one input 1212 for a particular rigging control system may be a control value for tilting the character's head towards the shoulder. The output value(s) 1218 for high-order controls can specify movements derived from the head tilting, such as movements for individual vertebrae down the neck. The output values can include multiple parameters, such as for translational movements and rotational movements in multiple directions. In situations such as this, a large number of rigging control output values can be generated from a small number of rigging control input values.

As another example, an eye pupil could have two parameters, where one parameter is for the up/down movements and the other parameter is for the left/right movements. Either or both of these parameters can be adjusted to implement movement of the eye pupil. These two parameters can also be provided as inputs 1212 to generate control outputs 1218 for higher-order rigging elements. For example, the rigging control outputs 1218 can be used to provide movements of the upper and/or lower eye lids in conjunction with the eye pupil movements, which can make the virtual character appear more realistic.

At block 1458, the rigging control output values can be translated by the embedded framework into a language, data structure, format, representation, etc. that is recognizable by the first application. At block 1462, the translated output(s) can be communicated back to the first application, which can use the output(s) to implement the associated behavior in the character rig.

With reference back to FIG. 14A, at block 1470 the embedded framework can export application-agnostic rigging control system data from the first application. The application-agnostic data can include rigging control system descriptions 1222, which may be exported as part of control systems data file 1232. The application-agnostic data can also include other rigging assets, such as skeletal systems and blendshapes.

At block 1490, the application-agnostic rigging control system data can optionally be imported into a second instance of the embedded framework in a second application. The second application can have a native rigging control protocol that is different than that of the first application or the embedded framework. The second application can use the rigging control system data to implement the virtual character in the same manner as the first application. As a result, the control system descriptions do not need to be reprogrammed in the second application. The systems and methods described herein allow for rigging control systems to be used any number of times by any number of applications.

Example Embodiments

1. A method comprising: receiving, from a first application which implements a first rigging control protocol, an input associated with a request for a behavior from a rig for a virtual character; converting the input to be compatible with a second rigging control protocol that is different from the first rigging control protocol; evaluating one or more control systems, based on the input, to determine an output to provide the requested behavior from the virtual character rig, the one or more control systems being defined according to the second rigging control protocol; converting the output to be compatible with the first rigging control protocol; and providing the output to the first application to manipulate the virtual character according to the requested behavior.

2. The method of Embodiment 1, wherein converting the input to be compatible with the second rigging control protocol comprises converting the input from a first mathematical representation utilized in the first rigging control protocol to a second mathematical representation utilized in the second rigging control protocol.

3. The method of Embodiment 1, wherein the input specifies a characteristic of a lower-order rigging element.

4. The method of Embodiment 3, wherein the lower-order rigging element comprises a core skeleton for the virtual character.

5. The method of Embodiment 4, wherein the input comprises a transform for a joint in the core skeleton.

6. The method of Embodiment 1, wherein the output specifies a characteristic of a higher-order rigging element.

7. The method of Embodiment 6, wherein the higher-order rigging element comprises a higher-order skeleton.

8. The method of Embodiment 7, wherein the output comprises a transform for a joint in the higher-order skeleton.

9. The method of Embodiment 6, wherein the higher-order rigging element comprises a blendshape.

10. The method of Embodiment 9, wherein the output comprises a blendshape weight.

11. The method of Embodiment 1, wherein evaluating the one or more control systems comprises evaluating a mathematical operation.

12. The method of Embodiment 11, wherein the mathematical operation comprises a radial basis function.

13. The method of Embodiment 11, wherein the mathematical operation comprises a Boolean operation.

14. The method of Embodiment 1, wherein the method is performed by a framework embedded in the first application.

15. The method of Embodiment 14, wherein the framework is a plug-in for the first application.

16. The method of Embodiment 1, further comprising: preparing a data file which specifies the one or more control systems; and outputting the data file to a second application.

17. The method of Embodiment 16, wherein the first application is a digital content creation application whose primary function comprises creation of virtual characters, and wherein the second application is a real-time engine.

18. The method of Embodiment 1, further comprising importing, from a second application, a data file which specifies the one or more control systems.

19. The method of Embodiment 18, wherein the first application is a real-time engine, and wherein the second application is a digital content creation application whose primary function comprises creation of virtual characters.

20. The method of Embodiment 19, further comprising executing the real-time engine on an augmented reality display system.

21. The method of Embodiment 1, wherein the virtual character comprises one or more rigging assets selected from the group comprising: a polygon mesh, a core skeletal system, a higher-order skeletal system, a blendshape, and an animation.

22. The method of Embodiment 1, wherein the first rigging control protocol comprises one or more data formats, data structures, functions, or computational units that are specific to the first application.

23. An apparatus comprising: a framework configured to receive, from a first application which implements a first rigging control protocol, an input associated with a request for a behavior from a rig for a virtual character; a first translator configured to convert the input to be compatible with a second rigging control protocol that is different from the first rigging control protocol; a rigging control evaluation system configured to evaluate one or more control systems, based on the input, to determine an output to provide the requested behavior from the virtual character rig, the one or more control systems being defined according to the second rigging control protocol; and a second translator configured to convert the output to be compatible with the first rigging control protocol, wherein the framework is configured to provide the output to the first application to manipulate the virtual character according to the requested behavior.

24. The apparatus of Embodiment 23, wherein converting the input to be compatible with the second rigging control protocol comprises converting the input from a first mathematical representation utilized in the first rigging control protocol to a second mathematical representation utilized in the second rigging control protocol.

25. The apparatus of Embodiment 23, wherein the input specifies a characteristic of a lower-order rigging element.

26. The apparatus of Embodiment 25, wherein the lower-order rigging element comprises a core skeleton for the virtual character.

27. The apparatus of Embodiment 26, wherein the input comprises a transform for a joint in the core skeleton.

28. The apparatus of Embodiment 23, wherein the output specifies a characteristic of a higher-order rigging element.

29. The apparatus of Embodiment 28, wherein the higher-order rigging element comprises a higher-order skeleton.

30. The apparatus of Embodiment 29, wherein the output comprises a transform for a joint in the higher-order skeleton.

31. The apparatus of Embodiment 28, wherein the higher-order rigging element comprises a blendshape.

32. The apparatus of Embodiment 31, wherein the output comprises a blendshape weight.

33. The apparatus of Embodiment 23, wherein evaluating the one or more control systems comprises evaluating a mathematical operation.

34. The apparatus of Embodiment 33, wherein the mathematical operation comprises a radial basis function.

35. The apparatus of Embodiment 33, wherein the mathematical operation comprises a Boolean operation.

36. The apparatus of Embodiment 23, wherein the framework is embedded in the first application.

37. The apparatus of Embodiment 36, wherein the framework is a plug-in for the first application.

38. The apparatus of Embodiment 23, wherein the framework is further configured to: prepare a data file which specifies the one or more control systems; and output the data file to a second application.

39. The apparatus of Embodiment 38, wherein the first application is a digital content creation application whose primary function comprises creation of virtual characters, and wherein the second application is a real-time engine.

40. The apparatus of Embodiment 23, wherein the framework is further configured to import, from a second application, a data file which specifies the one or more control systems.

41. The apparatus of Embodiment 40, wherein the first application is a real-time engine, and wherein the second application is a digital content creation application whose primary function comprises creation of virtual characters.

42. The apparatus of Embodiment 41, wherein the framework is further configured to execute the real-time engine on an augmented reality display system.

43. The apparatus of Embodiment 23, wherein the virtual character comprises one or more rigging assets selected from the group comprising: a polygon mesh, a core skeletal system, a higher-order skeletal system, a blendshape, and an animation.

44. The apparatus of Embodiment 23, wherein the first rigging control protocol comprises one or more data formats, data structures, functions, or computational units that are specific to the first application.

45. The apparatus of Embodiment 23, wherein the apparatus comprises an augmented reality display system.

46. A method comprising: creating, in a first application which implements a first rigging control protocol, a rigging control system description, the rigging control system description being defined according to a different second rigging control protocol, and the rigging control system description specifying a rigging control input and at least one rule for operating on the rigging control input to produce a rigging control output; writing the rigging control system description to a data file; and initiating transfer of the data file to a second application.

47. The method of Embodiment 46, wherein the method further comprises evaluating the rigging control system description using a framework embedded in the first application.

48. The method of Embodiment 47, wherein the framework is embedded in the first application as a plug-in.

49. The method of Embodiment 47, wherein the framework comprises an application programming interface to be called by the first application while creating the rigging control system description.

50. The method of Embodiment 47, wherein the method further comprises converting the rigging control input to be compatible with the second rigging control protocol prior to evaluating the rigging control system description.

51. The method of Embodiment 47, wherein the method further comprises converting the rigging control output to be compatible with the first rigging control protocol after evaluating the rigging control system description.

52. The method of Embodiment 46, wherein the rigging control input specifies a characteristic of a lower-order rigging element.

53. The method of Embodiment 52, wherein the lower-order rigging element comprises a core skeleton for a virtual character.

54. The method of Embodiment 53, wherein the rigging control input comprises a transform for a joint in the core skeleton.

55. The method of Embodiment 46, wherein the rigging control output specifies a characteristic of a higher-order rigging element.

56. The method of Embodiment 55, wherein the higher-order rigging element comprises a higher-order skeleton.

57. The method of Embodiment 56, wherein the rigging control output comprises a transform for a joint in the higher-order skeleton.

58. The method of Embodiment 55, wherein the higher-order rigging element comprises a blendshape.

59. The method of Embodiment 58, wherein the rigging control output comprises a blendshape weight.

60. The method of Embodiment 46, wherein the first application is a digital content creation application whose primary function comprises creation of virtual characters, and wherein the second application is a real-time engine.

61. The method of Embodiment 46, wherein the rigging control output comprises a higher-order rigging control value or a lower-order rigging control value.

62. The method of Embodiment 46, wherein the first rigging control protocol comprises one or more data formats, data structures, functions, or computational units that are specific to the first application.

63. An apparatus comprising: an authoring tool configured to create, in a first application which implements a first rigging control protocol, a rigging control system description, the rigging control system description being defined according to a different second rigging control protocol, and the rigging control system description specifying a rigging control input and at least one rule for operating on the rigging control input to produce a rigging control output; and a serialization tool configured to write the rigging control system description to a data file, and to initiate transfer of the data file to a second application.

64. The apparatus of Embodiment 63, wherein the apparatus further comprises a framework embedded in the first application, the framework being configured to evaluate the rigging control system description.

65. The apparatus of Embodiment 64, wherein the framework is embedded in the first application as a plug-in.

66. The apparatus of Embodiment 64, wherein the authoring tool comprises an application programming interface to be called by the first application while creating the rigging control system description.

67. The apparatus of Embodiment 64, wherein the framework is configured to convert the rigging control input to be compatible with the second rigging control protocol prior to evaluating the rigging control system description.

68. The apparatus of Embodiment 64, wherein the framework is further configured to convert the rigging control output to be compatible with the first rigging control protocol after evaluating the rigging control system description.

69. The apparatus of Embodiment 63, wherein the rigging control input specifies a characteristic of a lower-order rigging element.

70. The apparatus of Embodiment 69, wherein the lower-order rigging element comprises a core skeleton for a virtual character.

71. The apparatus of Embodiment 70, wherein the rigging control input comprises a transform for a joint in the core skeleton.

72. The apparatus of Embodiment 63, wherein the rigging control output specifies a characteristic of a higher-order rigging element.

73. The apparatus of Embodiment 72, wherein the higher-order rigging element comprises a higher-order skeleton.

74. The apparatus of Embodiment 73, wherein the rigging control output comprises a transform for a joint in the higher-order skeleton.

75. The apparatus of Embodiment 72, wherein the higher-order rigging element comprises a blendshape.

76. The apparatus of Embodiment 75, wherein the rigging control output comprises a blendshape weight.

77. The apparatus of Embodiment 63, wherein the first application is a digital content creation application whose primary function comprises creation of virtual characters, and wherein the second application is a real-time engine.

78. The apparatus of Embodiment 63, wherein the rigging control output comprises a higher-order rigging control value or a lower-order rigging control value.

79. The apparatus of Embodiment 63, wherein the first rigging control protocol comprises one or more data formats, data structures, functions, or computational units that are specific to the first application.

80. The apparatus of Embodiment 63, wherein the apparatus comprises an augmented reality display system.

81. A non-transitory computer-readable medium which, when read by a computing device, causes the computing device to perform a method comprising: receiving, from a first application which implements a first rigging control protocol, an input associated with a request for a behavior from a rig for a virtual character; converting the input to be compatible with a second rigging control protocol that is different from the first rigging control protocol; evaluating one or more control systems, based on the input, to determine an output to provide the requested behavior from the virtual character rig, the one or more control systems being defined according to the second rigging control protocol; converting the output to be compatible with the first rigging control protocol; and providing the output to the first application to manipulate the virtual character according to the requested behavior.

82. The computer-readable medium of Embodiment 81, wherein converting the input to be compatible with the second rigging control protocol comprises converting the input from a first mathematical representation utilized in the first rigging control protocol to a second mathematical representation utilized in the second rigging control protocol.

83. The computer-readable medium of Embodiment 81, wherein the input specifies a characteristic of a lower-order rigging element.

84. The computer-readable medium of Embodiment 83, wherein the lower-order rigging element comprises a core skeleton for the virtual character.

85. The computer-readable medium of Embodiment 84, wherein the input comprises a transform for a joint in the core skeleton.

86. The computer-readable medium of Embodiment 81, wherein the output specifies a characteristic of a higher-order rigging element.

87. The computer-readable medium of Embodiment 86, wherein the higher-order rigging element comprises a higher-order skeleton.

88. The computer-readable medium of Embodiment 87, wherein the output comprises a transform for a joint in the higher-order skeleton.

89. The computer-readable medium of Embodiment 86, wherein the higher-order rigging element comprises a blendshape.

90. The computer-readable medium of Embodiment 89, wherein the output comprises a blendshape weight.

91. The computer-readable medium of Embodiment 81, wherein evaluating the one or more control systems comprises evaluating a mathematical operation.

92. The computer-readable medium of Embodiment 91, wherein the mathematical operation comprises a radial basis function.

93. The computer-readable medium of Embodiment 91, wherein the mathematical operation comprises a Boolean operation.

94. The computer-readable medium of Embodiment 81, wherein the method is performed by a framework embedded in the first application.

95. The computer-readable medium of Embodiment 94, wherein the framework is a plug-in for the first application.

96. The computer-readable medium of Embodiment 81, wherein the method further comprises: preparing a data file which specifies the one or more control systems; and outputting the data file to a second application.

97. The computer-readable medium of Embodiment 96, wherein the first application is a digital content creation application whose primary function comprises creation of virtual characters, and wherein the second application is a real-time engine.

98. The computer-readable medium of Embodiment 81, wherein the method further comprises importing, from a second application, a data file which specifies the one or more control systems.

99. The computer-readable medium of Embodiment 98, wherein the first application is a real-time engine, and wherein the second application is a digital content creation application whose primary function comprises creation of virtual characters.

100. The computer-readable medium of Embodiment 99, wherein the method further comprises executing the real-time engine on an augmented reality display system.

101. The computer-readable medium of Embodiment 81, wherein the virtual character comprises one or more rigging assets selected from the group comprising: a polygon mesh, a core skeletal system, a higher-order skeletal system, a blendshape, and an animation.

102. The computer-readable medium of Embodiment 81, wherein the first rigging control protocol comprises one or more data formats, data structures, functions, or computational units that are specific to the first application.

103. A non-transitory computer-readable medium which, when read by a computing device, causes the computing device to perform a method comprising: creating, in a first application which implements a first rigging control protocol, a rigging control system description, the rigging control system description being defined according to a different second rigging control protocol, and the rigging control system description specifying a rigging control input and at least one rule for operating on the rigging control input to produce a rigging control output; writing the rigging control system description to a data file; and initiating transfer of the data file to a second application.

104. The computer-readable medium of Embodiment 103, wherein the method further comprises evaluating the rigging control system description using a framework embedded in the first application.

105. The computer-readable medium of Embodiment 104, wherein the framework is embedded in the first application as a plug-in.

106. The computer-readable medium of Embodiment 104, wherein the framework comprises an application programming interface to be called by the first application while creating the rigging control system description.

107. The computer-readable medium of Embodiment 104, wherein the method further comprises converting the rigging control input to be compatible with the second rigging control protocol prior to evaluating the rigging control system description.

108. The computer-readable medium of Embodiment 104, wherein the method further comprises converting the rigging control output to be compatible with the first rigging control protocol after evaluating the rigging control system description.

109. The computer-readable medium of Embodiment 103, wherein the rigging control input specifies a characteristic of a lower-order rigging element.

110. The computer-readable medium of Embodiment 109, wherein the lower-order rigging element comprises a core skeleton for a virtual character.

111. The computer-readable medium of Embodiment 110, wherein the rigging control input comprises a transform for a joint in the core skeleton.

112. The computer-readable medium of Embodiment 103, wherein the rigging control output specifies a characteristic of a higher-order rigging element.

113. The computer-readable medium of Embodiment 112, wherein the higher-order rigging element comprises a higher-order skeleton.

114. The computer-readable medium of Embodiment 113, wherein the rigging control output comprises a transform for a joint in the higher-order skeleton.

115. The computer-readable medium of Embodiment 112, wherein the higher-order rigging element comprises a blendshape.

116. The computer-readable medium of Embodiment 115, wherein the rigging control output comprises a blendshape weight.

117. The computer-readable medium of Embodiment 103, wherein the first application is a digital content creation application whose primary function comprises creation of virtual characters, and wherein the second application is a real-time engine.

118. The computer-readable medium of Embodiment 103, wherein the rigging control output comprises a higher-order rigging control value or a lower-order rigging control value.

119. The computer-readable medium of Embodiment 103, wherein the first rigging control protocol comprises one or more data formats, data structures, functions, or computational units that are specific to the first application.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and sub-combinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method comprising:
   receiving, from a first application which implements a first rigging control protocol, an input associated with a request for a behavior from a rig for a virtual character;
   converting the input so as to request the same behavior from the rig but to be compatible with a second rigging control protocol that is different from the first rigging control protocol;
   evaluating one or more control systems, based on the input, to determine an output to provide the requested behavior from the virtual character rig, the one or more control systems being defined according to the second rigging control protocol;
   converting the output so as to provide the same requested behavior from the rig but to be compatible with the first rigging control protocol; and
   providing the output to the first application to manipulate the virtual character according to the requested behavior,
   wherein the first riming control protocol comprises one or more data formats, data structures, functions, or computational units that are specific to the first application, and
   wherein the second riming control protocol comprises one or more data formats, data structures, functions, or computational units that are different than in the first rigging control protocol.

2. The method of claim 1, wherein converting the input to be compatible with the second rigging control protocol comprises converting the input from a first mathematical representation utilized in the first rigging control protocol to a second mathematical representation utilized in the second rigging control protocol.

3. The method of claim 1, wherein the input specifies a characteristic of a lower-order rigging element.

4. The method of claim 3, wherein the lower-order rigging element comprises a core skeleton for the virtual character.

5. The method of claim 4, wherein the input comprises a transform for a joint in the core skeleton.

6. The method of claim 1, wherein the output specifies a characteristic of a higher-order rigging element.

7. The method of claim 6, wherein the higher-order rigging element comprises a higher-order skeleton.

8. The method of claim 7, wherein the output comprises a transform for a joint in the higher-order skeleton.

9. The method of claim 6, wherein the higher-order rigging element comprises a blendshape.

10. The method of claim 9, wherein the output comprises a blendshape weight.

11. The method of claim 1, wherein evaluating the one or more control systems comprises evaluating a mathematical operation.

12. The method of claim 11, wherein the mathematical operation comprises a radial basis function.

13. The method of claim 11, wherein the mathematical operation comprises a Boolean operation.

14. The method of claim 1, wherein the method is performed by a framework embedded in the first application.

15. The method of claim 14, wherein the framework is a plug-in for the first application.

16. The method of claim 1, further comprising:
   preparing a data file which specifies the one or more control systems; and
   outputting the data file to a second application.

17. The method of claim 16, wherein the first application is a digital content creation application whose primary function comprises creation of virtual characters, and wherein the second application is a real-time engine.

18. The method of claim 1, further comprising importing, from a second application, a data file which specifies the one or more control systems.

19. The method of claim 18, wherein the first application is a real-time engine, and wherein the second application is a digital content creation application whose primary function comprises creation of virtual characters.

20. The method of claim 19, further comprising executing the real-time engine on an augmented reality display system.

21. The method of claim 1, wherein the virtual character comprises one or more rigging assets selected from the group comprising: a polygon mesh, a core skeletal system, a higher-order skeletal system, a blendshape, and an animation.

22. An apparatus comprising:
   a framework configured to receive, from a first application which implements a first rigging control protocol, an input associated with a request for a behavior from a rig for a virtual character;
   a first translator configured to convert the input so as to request the same behavior from the rig but to be compatible with a second rigging control protocol that is different from the first rigging control protocol;

a rigging control evaluation system configured to evaluate one or more control systems, based on the input, to determine an output to provide the requested behavior from the virtual character rig, the one or more control systems being defined according to the second rigging control protocol; and a second translator configured to convert the output so as to provide the same requested behavior from the rig but to be compatible with the first rigging control protocol, wherein the framework is configured to provide the output to the first application to manipulate the virtual character according to the requested behavior, wherein the first rigging control protocol comprises one or more data formats, data structures, functions, or computational units that are specific to the first application, and wherein the second riming control protocol comprises one or more data formats, data structures, functions, or computational units that are different than in the first riming control protocol.

23. The apparatus of claim 22, wherein the first translator is configured tc convert the input from a first mathematical representation utilized in the first rigging control protocol to a second mathematical representation utilized in the second rigging control protocol.

24. The apparatus of claim 22, wherein the input specifies a characteristic of a lower-order rigging element.

25. The apparatus of claim 24, wherein the lower-order rigging element comprises a core skeleton for the virtual character and the input comprises a transform for a joint in the core skeleton.

26. The apparatus of claim 22, wherein the output specifies a characteristic of a higher-order rigging element.

27. The apparatus of claim 26, wherein the higher-order rigging element comprises at least one of a higher-order skeleton and a blendshape, and wherein the output comprises at least one of a transform for a joint in the higher-order skeleton and a blendshape weight.

28. The apparatus of claim 22, wherein the rigging control evaluation system is configured to evaluate a mathematical operation, and wherein the mathematical operation comprises at least one of a radial basis function and a Boolean operation.

29. The apparatus of claim 22, wherein the framework is embedded in the first application.

30. The apparatus of claim 22, wherein the apparatus is further configured to:

prepare a data file which specifies the one or more control systems; and output the data file to a second application.

31. The apparatus of claim 30, wherein the first application is a digital content creation application whose primary function comprises creation of virtual characters, and wherein the second application is a real-time engine.

32. The apparatus of claim 22, wherein the apparatus is further configured to import, from a second application, a data file which specifies the one or more control systems.

33. The apparatus of claim 32, wherein the first application is a real-time engine, and wherein the second application is a digital content creation application whose primary function comprises creation of virtual characters.

34. The apparatus of claim 33, wherein the apparatus comprises an augmented reality display system.

35. The apparatus of claim 22, wherein the virtual character comprises one or more rigging assets selected from the group comprising: a polygon mesh, a core skeletal system, a higher-order skeletal system, a blendshape, and an animation.

36. A non-transitory computer-readable medium which, when read by a computing device, causes the computing device to perform a method comprising:

receiving, from a first application which implements a first rigging control protocol, an input associated with a request for a behavior from a rig for a virtual character;

converting the input so as to request the same behavior from the rig but to be compatible with a second rigging control protocol that is different from the first rigging control protocol;

evaluating one or more control systems, based on the input, to determine an output to provide the requested behavior from the virtual character rig, the one or more control systems being defined according to the second rigging control protocol;

converting the output so as to provide the same requested behavior from the rig but to be compatible with the first rigging control protocol; and providing the output to the first application to manipulate the virtual character according to the requested behavior, wherein the first riming control protocol comprises one or more data formats, data structures, functions, or computational units that are specific to the first application, and wherein the second rigging control protocol comprises one or more data formats, data structures, functions, or computational units that are different than in the first rigging control protocol.

37. The computer-readable medium of claim 36, wherein converting the input to be compatible with the second rigging control protocol comprises converting the input from a first mathematical representation utilized in the first rigging control protocol to a second mathematical representation utilized in the second rigging control protocol.

38. The computer-readable medium of claim 36, wherein the input specifies a characteristic of a lower-order rigging element.

39. The computer-readable medium of claim 38, wherein the lower-order rigging element comprises a core skeleton for the virtual character and the input comprises a transform for a joint in the core skeleton.

40. The computer-readable medium of claim 36, wherein the output specifies a characteristic of a higher-order rigging element.

41. The computer-readable medium of claim 40, wherein the higher-order rigging element comprises at least one of a higher-order skeleton and a blendshape, and wherein the output comprises at least one of a transform for a joint in the higher-order skeleton and a blendshape weight.

42. The computer-readable medium of claim 36, wherein evaluating the one or more control systems comprises evaluating a mathematical operation, and wherein the mathematical operation comprises at least one of a radial basis function and a Boolean operation.

43. The computer-readable medium of claim 36, wherein the method is performed by a framework embedded in the first application.

44. The computer-readable medium of claim 36, the method further comprising:
preparing a data file which specifies the one or more control systems; and
outputting the data file to a second application.

45. The computer-readable medium of claim 44, wherein the first application is a digital content creation application whose primary function comprises creation of virtual characters, and wherein the second application is a real-time engine.

46. The computer-readable medium of claim 36, the method further comprising importing, from a second application, a data file which specifies the one or more control systems.

47. The computer-readable medium of claim 46, wherein the first application is a real-time engine, and wherein the second application is a digital content creation application whose primary function comprises creation of virtual characters.

48. The computer-readable medium of claim 47, the method further comprising executing the real-time engine on an augmented reality display system.

49. The computer-readable medium of claim 36, wherein the virtual character comprises one or more rigging assets selected from the group comprising: a polygon mesh, a core skeletal system, a higher-order skeletal system, a blendshape, and an animation.

* * * * *

UNITED STATES PATENT AND TRADEMARK OFFICE
CERTIFICATE OF CORRECTION

PATENT NO. : 11,276,219 B2
APPLICATION NO. : 17/047339
DATED : March 15, 2022
INVENTOR(S) : Wedig et al.

It is certified that error appears in the above-identified patent and that said Letters Patent is hereby corrected as shown below:

In the Specification

In Column 13, Line 64, delete "IMUS," and insert --IMUs,--.

In the Claims

In Column 51, Claim 1, Line 64, delete "riming" and insert --rigging--.

In Column 52, Claim 1, Line 1, delete "riming" and insert --rigging--.

In Column 53, Claim 22, Line 20, delete "riming" and insert --rigging--.

In Column 53, Claim 22, Line 23, delete "riming" and insert --rigging--.

In Column 53, Claim 23, Line 25, delete "tc" and insert --to--.

In Column 54, Claim 36, Line 29 (Approx.), delete "riming" and insert --rigging--.

Signed and Sealed this
Fifth Day of July, 2022

Katherine Kelly Vidal
Director of the United States Patent and Trademark Office